US 6,661,594 B2

(12) United States Patent
Satoh et al.

(10) Patent No.: US 6,661,594 B2
(45) Date of Patent: Dec. 9, 2003

(54) SIGNAL PROCESSING CIRCUIT AND INFORMATION RECORDING/ REPRODUCING APPARATUS USING THE SAME, AND METHOD FOR OPTIMIZING COEFFICIENTS OF EQUALIZER CIRCUIT

(75) Inventors: Naoki Satoh, Odawara (JP); Seiichi Mita, Kanagawa-ken (JP); Shoichi Miyazawa, Yokohama (JP); Terumi Takashi, Odawara (JP); Yosuke Hori, Hiratsuka (JP); Yoshiju Watanabe, Kanagawa-ken (JP); Akihiko Hirano, Odawara (JP); Satoshi Minoshima, Fujisawa (JP); Hideki Miyasaka, Yokohama (JP); Toshihiro Nitta, Hiratsuka (JP); Tomoaki Hirai, Odawara (JP); Ryushi Shimokawa, Takasaki (JP); Koji Shida, Takasaki (JP); Yasuhide Ouchi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/277,695

(22) Filed: Oct. 23, 2002

(65) Prior Publication Data

US 2003/0035236 A1 Feb. 20, 2003

Related U.S. Application Data

(63) Continuation of application No. 09/785,327, filed on Feb. 20, 2001, which is a continuation of application No. 09/444,395, filed on Nov. 22, 1999, now abandoned, which is a continuation of application No. 09/132,756, filed on Aug. 12, 1998, now abandoned, which is a continuation of application No. 08/506,635, filed on Jul. 25, 1995, now Pat. No. 5,818,655.

(30) Foreign Application Priority Data

Jul. 27, 1994 (JP) .............................................. 6-175094
Mar. 31, 1995 (JP) .............................................. 7-075009

(51) Int. Cl.$^7$ ................................................. G11B 5/35
(52) U.S. Cl. ....................................................... 360/65
(58) Field of Search ............................. 360/63, 29, 46, 360/55; 375/341; 714/794

(56) References Cited

U.S. PATENT DOCUMENTS 3,665,394 A 5/1972 Lender et al.
3,775,685 A 11/1973 Eggimann et al.

(List continued on next page.)

FOREIGN PATENT DOCUMENTS

| JP | 2845878 | 5/1989 |
| JP | 2-150114 | 6/1990 |
| JP | 3-144969 | 6/1991 |
| JP | 0168904 | 7/1991 |
| JP | 3296904 | 12/1991 |
| JP | 5342512 | 12/1993 |
| JP | 6-125244 | 5/1994 |

OTHER PUBLICATIONS

B. Widrow, Adaptive Signal Processing, 1985, pp. 16–17.

Primary Examiner—David Hudspeth
Assistant Examiner—K. Wong
(74) Attorney, Agent, or Firm—Mattingly, Stanger & Malur, P.C.

(57) ABSTRACT

A signal processing circuit for a magnetic recording/ reproducing apparatus, including at least an AGC, a PLL, a LPF, an equalizer circuit and a detection circuit, wherein a coefficient compensation circuit is formed by defining a constitution of the equalizer circuit, an error detection circuit is provided which operates by receiving input from the detection circuit, and the LSI is formed by a plurality of analog and digital chips, and the analog and digital chips are connected by current-output type D/A converters connected to at least the AGC and the PLL.

13 Claims, 22 Drawing Sheets

U.S. PATENT DOCUMENTS

| | | |
|---|---|---|
| 4,613,913 A | 9/1986 | Philips |
| 4,777,542 A | 10/1988 | Ozaki |
| 4,847,703 A | 7/1989 | Sakata et al. |
| 4,907,100 A | 3/1990 | Nishiyama et al. |
| 5,060,088 A | 10/1991 | Dolivo et al. |
| 5,262,904 A | 11/1993 | Tang et al. |
| 5,274,512 A | 12/1993 | Tanaka et al. |
| 5,307,213 A | 4/1994 | Nishiyama |
| 5,341,249 A | 8/1994 | Abbott et al. |
| 5,381,359 A | 1/1995 | Abbott et al. |
| 5,400,189 A | 3/1995 | Sato et al. |
| 5,450,253 A | 9/1995 | Seki et al. |
| 5,467,232 A | 11/1995 | Ouchi et al. |
| 5,493,454 A | 2/1996 | Ziperovich et al. |
| 5,519,398 A | 5/1996 | Satoh et al. |
| 5,519,676 A | 5/1996 | Kitahara |
| 5,521,767 A | 5/1996 | Weng et al. |
| 5,526,200 A | 6/1996 | Yada |
| 5,533,031 A | 7/1996 | Dounn et al. |
| 5,553,104 A | 9/1996 | Takashi et al. |
| 5,625,505 A | 4/1997 | Ohmori et al. |
| 5,818,655 A | 10/1998 | Satoh et al. |
| 6,198,587 B1 | 3/2001 | Hayashi et al. |

AN EXAMPLE OF PHASE MARGIN
EVALUATION IN PRIOR ART

WRITE CURRENT VALUE VS. PHASE MARGIN
CHARACTERISTICS IN PRIOR ART

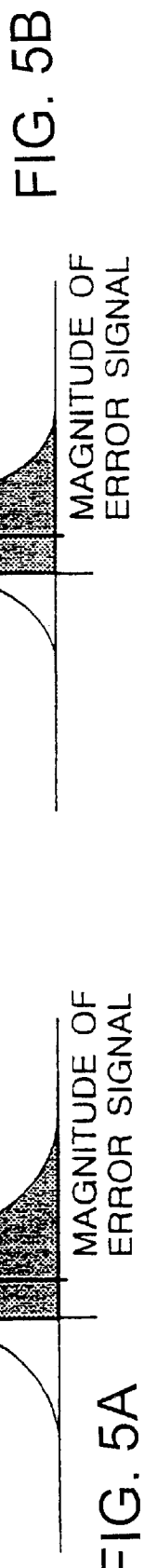
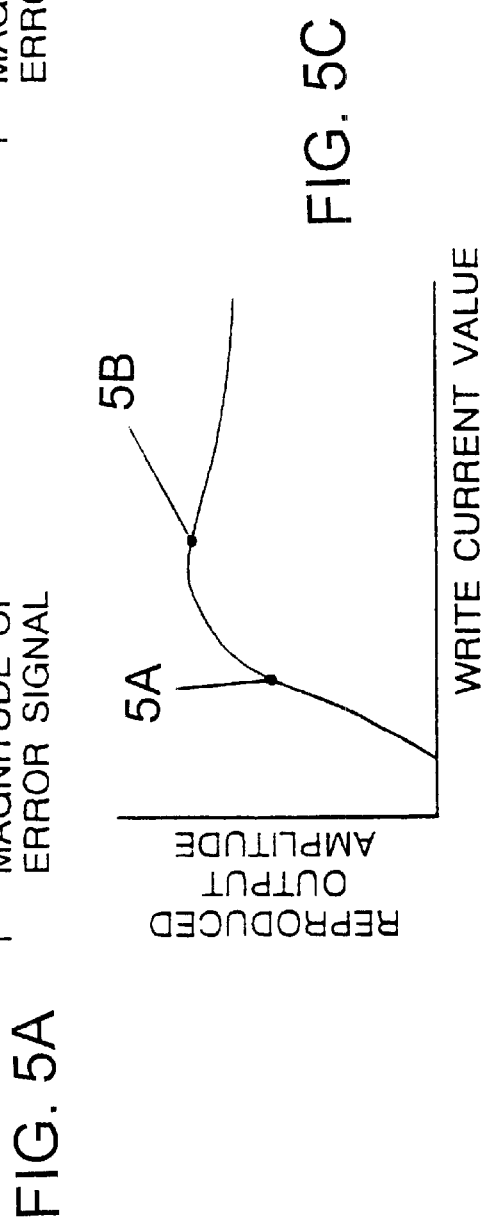
FIG. 5A
FIG. 5B
FIG. 5C

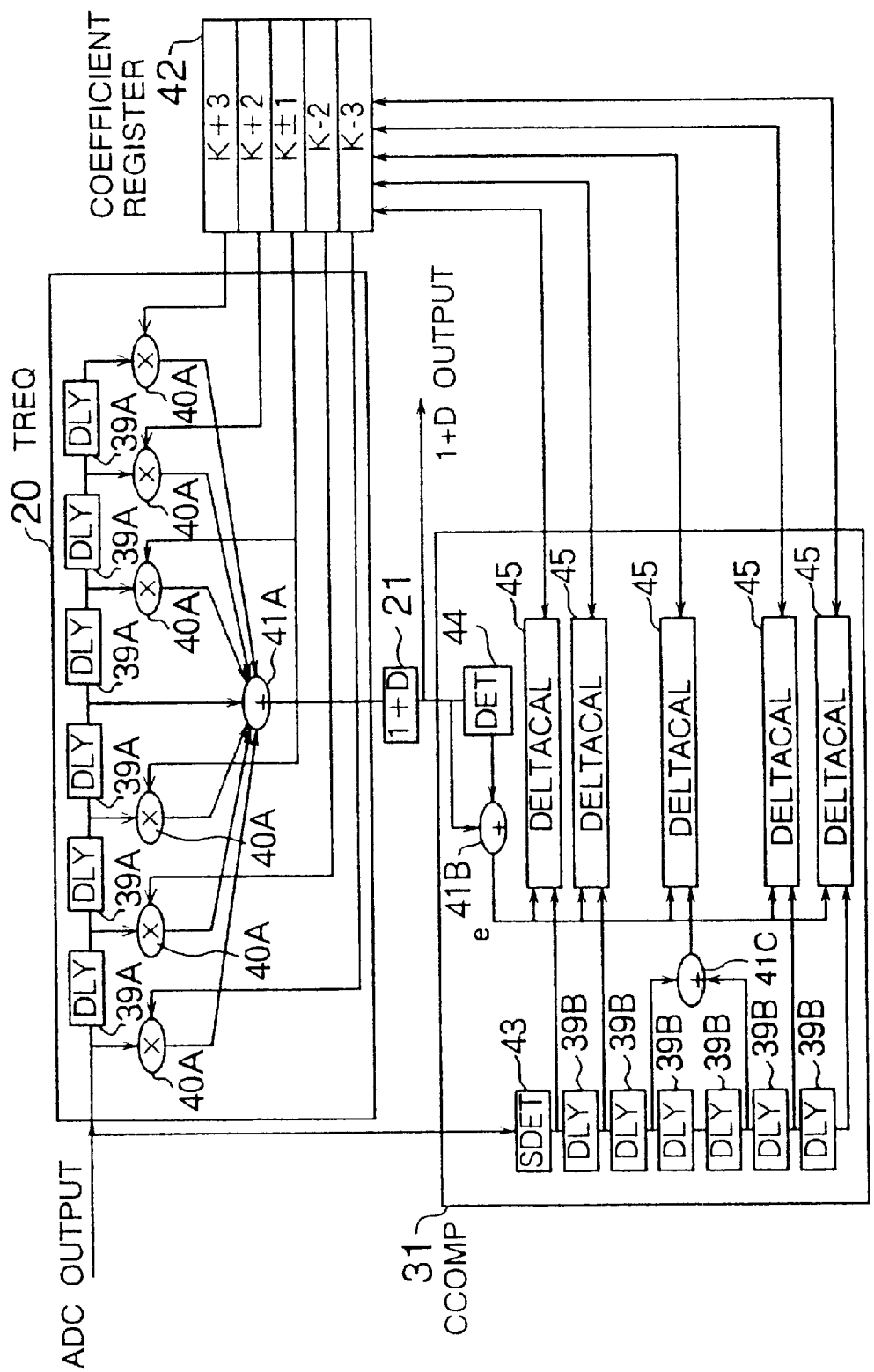

SIGNAL PROCESSING CIRCUIT AND INFORMATION RECORDING/ REPRODUCING APPARATUS USING THE SAME, AND METHOD FOR OPTIMIZING COEFFICIENTS OF EQUALIZER CIRCUIT

This is a continuation application of U.S. Ser. No. 09/785,327, filed Feb. 20, 2001, which is a continuation application of U.S. Ser. No. 09/444,395, filed Nov. 22, 1999, now abandoned, which is a continuation application of U.S. Ser. No. 09/132,756 filed Aug. 12, 1998, now abandoned, which is a continuation application of Ser. No. 08/506,635 filed Jul. 25, 1995, now U.S. Patent No. 5,818, 655.

BACKGROUND OF THE INVENTION

The present invention relates to an information recording/reproducing apparatus, such as a magnetic disk apparatus and a magneto-optic disk apparatus, and a signal processing circuit used in those apparatuses, and more particularly to a circuit and a method for optimizing coefficients of an equalizer circuit having functions of estimating a detection or discrimination performance in optimization of the equalizer circuit, and optimization of various conditions in recording and reproduction, such as the write current value, DC offset compensation amount, etc, in apparatuses involving a partial response processing.

In an information recording/reproducing apparatus of this kind, it is necessary to optimally set various control parameters for recording and reproducing signals. To give an example, the optimization of the write current value in a magnetic disk apparatus is performed as follows. A write current value is set and recorded on a magnetic disk, then the bit error rate (BER) is measured while varying the phase of the discrimination window of the phase discriminator, which is a detection circuit of the reproduced signal processing circuit, to measure the phase width (phase margin) of the discrimination window which provides a tolerable level of BER (e.g., 1.0E−8 or less). FIG. 2 shows a so-called bucket curve. This measurement is performed each time the write current value is changed, and the phase margins at various write current values are obtained. As shown in FIG. 3, the relation between write current values and the corresponding phase margins are checked and the write current value at which the phase margin is greatest is taken as the optimum value.

In evaluation of the BER in an apparatus of phase discrimination system of this kind, in order to obtain a bucket curve as shown in FIG. 2, a length of time at least in the order of minutes is required. It follows therefore that several minutes are required only to perform the optimization of the write current mentioned above.

In an actual optimization process, in addition to the write current value, other optimization parameters include the compensation amount (in what is referred to as write pre-compensation) of the flux reversal positions of the write current, equalizer circuit characteristics and detection levels of the error detector. More importantly, since those parameters are evaluated using a random pattern, they cannot be evaluated independently of each other. For this reason, in order to optimize the parameters with high accuracy, measurement of the bucket curve is preferably performed as many times as the product of the number of parameters and the number of partitions of the parameters, so that a vast length of time is required for the whole optimization process. If there are great variations among the magnetic heads and the recording/reproducing circuits, it is necessary to perform this optimization process for individual apparatuses and magnetic heads, so that a much greater length of time is required.

In evaluation of the BER by amplitude detection system, on the other hand, the technique disclosed in JP-A-3-144969 is well known. This method is such that a sequence of digital signals input to the detector of the apparatus are compared with a sequence of reference signals to measure a histogram of error values to thereby estimate a BER of the apparatus. The number of bits required to measure the histogram with high accuracy is on the order of thousands or tens of thousands at most, and this number is far smaller than one in the above-mentioned case (1.0E+8 bits or greater) using the phase detection system which measures the BER directly, and hence the time required to optimize the parameters is much shorter.

In the evaluation based on the estimation of the BER in the apparatus of amplitude discrimination system revealed in JP-A-3-144969, however, a relatively large scale evaluation device is required for measuring a histogram of error values. It is required to determine error values in real time and install counters or memories as many as the number of the histograms measured. If this measurement of the histograms is made inside the apparatus, an increase in the scale of the circuit is inevitable. If histograms are measured outside the apparatus while monitoring the input signal of the detector on the circuit board, measurement has to be performed at the bit rate of the apparatus, which poses a great difficulty in mounting or packaging the measuring apparatus in the case of an apparatus adapted to operate at high data transmission rate exceeding 100 Mbps.

With regard to the technique of optimizing the tap coefficients of an equalizer circuit, there is a method disclosed in JP-A-2-150114. In this publication, looking at the fact that the reproduced waveform (so-called solitary magnetization reproduced waveform) which corresponds to a single flux reversal or magnetization reversal in an information recording/reproducing apparatus such as a magnetic disk apparatus or a magneto-optic disk apparatus is a waveform that has the leading and trailing foot portions formed substantially so symmetrically as to be simulated by a Lorentzian waveform, there are proposed coefficient compensation means and a method of a transversal type equalizer circuit with symmetric coefficients at three taps, in other words, a so-called cosine equalizer circuit, wherein in a format on the magnetic disk, a training area of several bytes is provided before user data to perform coefficient compensation in real time.

In a case where only one tap coefficient is to be optimized as in a cosine equalizer circuit, it is preferable to use the method disclosed in JP-A-2-150114 mentioned above. However, if data is to be recorded with high density, the resolution of the reproduced waveform deteriorates, the foot portions of the waveform trail long, and the symmetry of the reproduced waveform is disturbed, and consequently a sufficient equalizing performance cannot be obtained with a cosine equalizer circuit which roughly adjusts the amplitude characteristics only.

As coefficient compensation algorithms capable of obtaining optimum values for a plurality of tap coefficients with relatively high accuracy, sequential compensation type algorithms such as CLMS (clipped least means square) are well known. However, in an apparatus which restores a clock signal for an equalizer circuit from a signal obtained at the subsequent stage of the equalizer circuit, contention occurs between the phase characteristic of the equalizer circuit and clock phase due to tap coefficients of the equalizer becoming asymmetric in the coefficient compensation process, and because of this, the characteristics of the equalizer circuit do not settle. Moreover, a problem arises that the coefficients in the converged state unavoidably oscillate due to the delays of the equalizer circuit and the coefficient compensation circuit portion and also due to the effects of the finite bit number of the digital circuit, and for this reason, a sufficient performance cannot be obtained.

To execute the above-mentioned coefficient compensation operation, the head disk controller needs to cause the read gate to open when the head is located over a data area, and for this purpose at least ID must be able to be read even under a condition that the equalizer circuit is not in the optimized state. Therefore, it is required that a data pattern (a sync byte in this case) to demarcate an area for use with AGC/PLL from a data area be formed in a specific pattern easy to identify.

Furthermore, if a signal processing circuit is designed as a LSI, the scale of the circuit becomes large-size, so it is important to take into consideration the chip area, power consumption, the number of pins. cost, etc. It is desired that all components be packaged in a one-chip LSI. However, if power consumption is large, for instance, the signal processing circuit needs to be formed in two or more subdivided chips and hence it is important at what portion the circuit is to be divided.

SUMMARY OF THE INVENTION

An object of the present invention is to provide a high-performance small-scale signal processing circuit, which compensates the amplitude characteristics with high accuracy and also compensates the phase characteristics by a combination of a sequential compensation type coefficient compensation circuit and an equalizer circuit, and provide an information recording/reproducing apparatus using the above-mentioned signal processing circuit.

Another object of the present invention is to provide a method and an apparatus for optimizing various control parameters, which enable the optimization of various control parameters of an information recording/reproducing apparatus in a relatively short time.

Yet another object of the present invention is to provide a more efficient LSI configuration when implementing a reproduced signal processing circuit by subdividing it into LSIs of a plurality of chips.

The above objects of the present invention are achieved by a signal processing circuit including an equalizer circuit and a sequential compensation type coefficient circuit, configured as described in the following.

This signal processing circuit uses a transversal type equalizer circuit with five or more taps, and of the tap coefficients of the equalizer circuit, the tap coefficients adjacent on both sides to the center tap are specified at the same value. Results of simulation by the present inventors showed that when the same value is set for the tap coefficients adjacent on both sides to the center tap, even if the two taps at the extreme ends on both sides are left free, contention with the phase characteristics of the PLL can be avoided, and even if the coefficient compensation circuit is of the sequential compensation type, the coefficient compensation process can proceed stably. The reason is that even when a signal input to the equalizer circuit has a phase distortion, since at least the two coefficients at the extreme end taps on both sides take different values, the waveform distortion after equalization can be minimized.

At this time, the phase distortion of the signal appears as the front-back symmetry Tas of a solitary waveform, and if the Tas is defined as $Tas = T1 - T2/PW50$ $(PW50 = T1 + T2)$, According to the present invention, even when Tas=11%, an equalizing performance substantially equivalent to a Wiener filter (an optimum filter for minimizing the square error) can be obtained. With regard to the symbols in the above equation, PW50 is a mesial point width, the leading edge of PW50 is designated by T1 and the trailing edge is designated by T2. According to the simulation results, if a ratio S of the mesial point width PW50 of a signal input to the equalizer circuit to a data period Tb (this ratio S is called a channel density) is $S = PW50/Tb > 2$, the tap number of the equalizer circuit is preferably seven or larger. If the tap number is five, errors are large at the output of the equalizer circuit, so that a good apparatus performance cannot be obtained. In this case, too, of the tap coefficients of the equalizer circuit, only the tap coefficients adjacent on both sides to the center tap are specified at the same value and hence the other four taps on the farther positions on both sides may take different values.

In the present invention, in a transversal type equalizer circuit with five or more taps, of the tap coefficients of the equalizer circuit, not only those adjacent on both sides to the center tap but also those at the positions symmetric with respect to the center tap are preferably, in some cases, at the same value. This is because if there is a good symmetry in the impulse response of signals input to the equalizer circuit, equalization with high accuracy is possible even with a low resolution. Accordingly, in addition to the effect that no contention of phase characteristics occurs as described above, another effect is that coefficient compensation is carried out for all taps by an average or mean correlation signal of two bits at respective tap positions, so that the magnitude of noise of the input signal can be reduced to about 0.7 times the original magnitude and for this reason, coefficient compensation can be performed with good stability.

Further, in the present invention, in an application using a transversal type equalizer circuit, negative coefficient values of the equalizer circuit should preferably be able to be set with positive coefficient values by inverting the output of tap delay means. As in a reproduced waveform of a solitary magnetization in magnetic recording, in the case of a waveform with its foot portions lowering in a relatively monotonous form, the tap coefficients of a transversal type equalizer circuit for equalizing this waveform change their signs alternately in a sequence of minus, plus, minus, plus and so on towards both ends if the sign of the coefficient at the center tap is plus. Therefore, it is possible to output data by inverting data at the tap positions which can be estimated to be negative coefficients. Consequently, the signs of the coefficient bits of the equalizer circuit can be omitted and thus the scale of the circuit can be reduced.

In the present invention, the tap coefficients are preferably set in registers. A coefficient value "0" is set at specific tap positions of the transversal type equalizer circuit and the coefficient compensation operation is stopped. By this arrangement, it is possible to perform the most desirable form of coefficient compensation when a small tap number is set, and furthermore power consumption is reduced at the taps with coefficients of "0".

An input signal to the equalizer circuit is preferably input to the coefficient compensation circuit after it is processed into a partial response waveform, for example. By so doing, the accuracy of the coefficient compensation circuit can be improved, coefficient compensation using a rather random, arbitrary data pattern becomes possible, and this compensation operation can be carried out at the user site. For example, even when the characteristics of the magnetic head or disk medium change with time in a magnetic disk apparatus, the optimum equalizer circuit condition can be maintained at all times on the apparatus.

The coefficient compensation of an equalizer circuit according to the present invention is performed by using the following means. To be more specific, the coefficient compensation circuit includes simplified detection means for roughly discriminating an input signal of the equalizer circuit, error calculating means for calculating an error signal from an output signal of the equalizer circuit and the simplified detection means, delay means for delaying the output signal of the simplified detection means, correlation value calculating means for calculating a correlation value between the output signal of the delay means and an output signal of the error calculating means, correlation value adding means for sequentially adding output signals of the correlation value calculating means, delta-value calculation means for calculating a coefficient compensation amount from a signal obtained by adding output signals of the correlation value adding means a certain number of times, and coefficient error compensating means for compensating the coefficient values of the equalizer circuit by an output signal of the coefficient compensation amount calculating means, wherein the coefficient compensation circuit is stopped from performing a sequential addition of correlation values for a delay time after the coefficient compensation is executed until the signal input to the equalizer circuit is output or longer.

According to the above arrangement, correlation data is not obtained while the coefficients are being compensated and the correlation data is accumulated using fixed tap coefficient value at all times. Therefore, the coefficient compensation circuit according to this arrangement does not allow errors to occur which used to occur due to a loop delay in the conventional CLMS (clipped least mean square) step. In addition, this coefficient compensation circuit is basically a open loop and therefore can perform signal processing steps sufficiently, which includes averaging (corresponding to the operation of the correlation value calculating means in this arrangement), and can reduce the effects of the finite bit number or the like, and high hopes can be held on this coefficient compensation circuit for compensation with improved accuracy.

The above-mentioned coefficient compensation circuit may further include delay time control means for controlling the amount of delay of the delay means, selection means for selecting a tap coefficient to be compensated, in an interlocked manner with the delay time control means, and coefficient temporary holding means for temporarily holding a tap coefficient value compensated by the coefficient error compensating means, wherein the delay time may be a fixed amount when the tap coefficient compensation amounts are calculated and all tap coefficients may be compensated when respective tap coefficient values have been decided by controlling the selection means. The coefficient compensation means according to the present invention is formed basically in a open loop, as stated above. Therefore, if it is possible to guarantee the linearity and the randomness of a signal input to the equalizer circuit, respective tap coefficients need not be compensated by the same information (signal). The tap coefficients can be compensated in a time sharing manner, and for this reason the circuit scale can be reduced in a great measure.

Further, in the above-mentioned arrangement, an input signal to the equalizer circuit, which also is an input signal to the coefficient compensation circuit of the equalizer circuit, and an output signal from the equalizer circuit can be input after they are both decimated. As has been described, in the coefficient compensation means, it is only required to receive error signals between an input signal and an output signal of the equalizer circuit, which correspond to the tap coefficients. Therefore, the error signals between the input signal and output signal of the equalizer circuit need not necessarily be obtained continuously, but may be decimated as mentioned above. By decimation, the operation frequency of the coefficient compensation circuit can be reduced to 1/(decimation number+1), so that the power consumption can be reduced to a great extent without increasing the scale of the circuit.

As means for external calculation of the optimum coefficient value, data holding means may be provided to hold, in step with the data clock, signals supplied to the transversal type equalizer circuit for each data segment having at least twice the number of all taps of the equalizer circuit, and output the data held therein by clock means other than the data clock. As for means for obtaining tap coefficients of the equalizer circuit other than the above-mentioned sequential compensation circuit, there is a method of storing a considerable amount of the input signal to the equalizer circuit serially, and giving an ideal output corresponding to the stored input signal to thereby obtain a generally well-known Wiener filter solution. By using this method, it is possible to transfer the stored data to the outside and obtain the optimum solution by a matric operation. The data segment length can be reduced to about twice the number of taps of the equalizer circuit by making contrivance to the data pattern or the like. Note that a longer data segment makes the effects of noise smaller, making it possible to obtain better tap coefficients.

According to the present invention, as a circuit for optimizing the parameters, an error detection circuit can be formed as described in the following.

For example, an error detection circuit includes error calculating means for calculating an error signal in a (second) detection circuit from the input signal supplied to the (second) detection circuit and the output signal from the (second) detection circuit, distinction means for outputting a count signal when an error signal is larger than a preset threshold value; and counting means for counting the count signals. An error signal between the input signal to the detection circuit in the signal processing circuit and the target amplitude of the equalizer circuit is obtained by the (second) detection circuit and the error calculating circuit. This error signal is compared with the fixed threshold value set on the distinction circuit, and when the error signal is equal to or larger than the threshold value, a distinction output is set to "1", or otherwise the distinction output goes to "0". The above-mentioned counting means increments only when the distinction means produces a "1" output.

The input signal and the error signal of the above-mentioned detection circuit occur as shown in FIG. 4, and the error signal is distributed over positive and negative sides with "0" at the center of distribution and is therefore regarded as substantially a normal distribution. Hence, the ratio of the count value to a total population parameter is decided by the variance value of the error signals and the above-mentioned fixed threshold value of the distinction means. In other words, because the total population parameter and the threshold value are known, the variance value of the error signal can be estimated by the count value. Generally, the performance (BER) of the detection means in the apparatus depends on the quality (the variance value, for example) of signal input to the detection means. Therefore, by minimizing the variance value, the various parameters of the apparatus can be optimized.

In the above-mentioned error detection circuit, the detection level of the (second) detection circuit may be set by using a register. If it is so arranged that the detection level of the (second) detection circuit in the error detection circuit can be set arbitrarily, error detection is possible with the threshold value being varied and this offers the following advantages. Normally, the (second) detection circuit has binary detection levels of +0.5 and −0.5 to detect ternary levels of +1, 0 and −1. For example, if the output data pattern of the equalizer circuit to be detected is a data pattern which can take only two values of +1 and −1, detection errors are likely to occur depending on the magnitude of errors and noise at the above-mentioned detection levels. In this case, if the threshold value is set at "0", the detection circuit can be made to operate as a substantially binary detection circuit, which means that the detection performance is improved (the antinoise performance is improved twice as high) and the error signals can be detected to a more accurate value, so that a more accurate optimization of the apparatus can be achieved.

Further, in the above-mentioned error detection circuit, the detection level of the (second) detection circuit can be set by a register. If the (second) detection circuit can be operated as a binary-output type detection circuit which has one threshold value, the detection performance can be improved (the antinoise performance is improved twice higher than in the prior art) with respect to a specific data pattern and accordingly error signals can be detected to a more accurate value. If the output of the (second) detection circuit is kept at "0" at all times, the output value of the equalizer circuit can be input directly to the distinction means.

Further, the above-mentioned error detection circuit may be used along with a register or the like, as described in the following. To give an example, the signal processing circuit may be added with a write current setting register and a write current output terminal. The relation between the write current value of the recording head in an information recording/reproducing apparatus and the amplitude of the reproduced output input to the signal processing circuit is substantially as shown in FIG. 5. Generally, the larger the amplitude of the reproduced output detected by the reproducing head is, the better the quality of the reproduced signal becomes. At this time, if the input signal to the detection means of the signal processing circuit is a signal corresponding to a pattern of . . . +1, +1, −1, −1, +1, +1 . . . , the typical signal amplitude is made to have only two levels of positive and negative equalization target values by the automatic gain control circuit, providing no level corresponding to "0". Because the ratio of noise to a signal is larger for a smaller reproduced output amplitude, the variance of the error signals input to the distinction means is greater as shown in FIG. 5. Therefore, if the error signals are judged by a suitable negative threshold value and the occasions that an error signal is higher than the threshold value are counted each time the write current value is changed, it will be known that the write current value at which the count value (the number of counts) is greatest is the optimum condition.

According to the present invention, the signal processing circuit may include therein a register to set a sense current value of the reproducing head and a sense current output terminal. When a magnetoresistive effect element is used for the reproducing head of an information recording/reproducing apparatus, if the bias magnetization by the head is not optimized, the amplitude of the reproduced waveform varies depending on the polarity of solitary magnetization. Solitary waveforms are input to the signal processing circuit through AC coupling, the signal to the detection circuit signal shifts with respect to the "0" level as shown in FIG. 7. Therefore, data is recorded in a recording pattern such that the magnetization density on the recording medium is lowest, and errors are detected each time the sense current value is changed, as follows.

The output of the (second) detection circuit is maintained at "0" at all times, the output of the equalizer circuit is input directly to the distinction means and the threshold value of the distinction means is set at "0", and each time the sense current value is changed, the occasions that the threshold value "0" is exceeded for a fixed period of time are counted. When the bias magnetization by the sense current is not optimized and the amplitude ratio varies, the mean value of the error signal shifts from "0", so that the count value does not become ½ of a total population parameter. The sense current at which the shift at this time from "0" is less than the reference value and the count value obtained by a fixed negative threshold value is greatest is taken as the optimum sense current.

Further, the signal processing circuit may include therein an offset setting circuit for DC offset compensation and an offset compensation register, and the offset amount may be compensated from the no signal condition.

By making arrangement such that the output signal of the equalizer circuit comprises only random circuit noise and detecting errors each time the setting value of the offset compensation amount is changed, the offset compensation amount at which the shift of the mean value of the error signals of equalizer circuit output from "0" is smallest is taken as the optimum offset compensation amount.

Note that in a signal processing circuit of the same configuration as mentioned above, the offset amount may be compensated from a single-frequency signal.

By recording data of a single recording frequency and by detecting errors each time the offset compensation amount setting is changed, the offset compensation amount at which the error variance of equalizer circuit output is smallest is taken as the optimum offset compensation amount.

In the present invention, in the signal processing circuit mentioned above, coefficient registers to give desirable characteristics to the equalizer circuit are provided. By using recorded data in a random form and detecting-errors each time the coefficient value setting is changed, the coefficient value at which the error variance of equalizer circuit output is smallest is taken as the optimum offset coefficient value.

A register for a compensation value of the write pre-compensation circuit to compensate the flux reversal positions during recording data according to a sequence of data may be used. By using random data for recording, and detecting errors each time data is recorded with the value setting changed in the compensation value register, the write pre-compensation value at which the error variance of equalizer circuit output is smallest is taken as the optimum compensation value.

In another embodiment of the error detection circuit in the present invention, the error detection circuit may be formed to include distinction means to receive an input signal which is also supplied as an input signal to the detection circuit and output a count signal when the input error-signal is larger than a threshold value; counting means for counting count signals output from the distinction means; and means for setting the threshold value. By arranging such that the output signal of the equalizer circuit (the input signal to the detection circuit) comprises only circuit noise in substantially random form and detecting errors each time the offset compensation amount setting is changed, the offset compensation amount at which the shift of the mean value of the error signals of output of the equalizer circuit from "0" is smallest is taken as the optimum offset compensation amount.

Adjustment of the offset compensation value and optimization of the sense current of the magnetoresistive effect type reproducing head can be performed without the (second) detection circuit. A signal processing circuit to enable these operations includes first distinction means for receiving an input signal which is also supplied to the detection circuit and outputting a count signal when the input error signal is less than the threshold value; first counting means for counting count signals from the first distinction means; second distinction means for outputting a count signal when the input error signal is larger than the threshold value; second counting means for counting count signals from the second distinction means; count value calculating means by subtracting the count value of the second counting means from the count value of the first counting means; and means for setting the threshold value.

According to this circuit, by using output signals from the equalizer circuit to directly count errors, it is possible optimize the offset adjustment and the sense current of the magnetoresistive effect type reproducing head.

Note that in this circuit, out of the input signals to the detection circuit, the signals from which sign bits have been removed may be accepted as input signals. If the sign bits are removed from the input signals to the detection circuit (output signals from the equalizer circuit), the negative input signals are converted into positive signals and the originally positive input signals remain unchanged (when the original signals are expressed in 2s compliments). When the output signals of the equalizer circuit are of a single frequency type like +1, +1, −1, −1, +1, +1, −1, −1 and so on, the signals from which the sign bits have been removed are converted as shown in FIG. 7. Therefore, by setting the threshold value of the distinction means in the neighborhood of the target value of equalization of the equalizer circuit, the variance of errors can be detected.

Further, in the circuit mentioned above, it is possible to provide two modes; a first mode to accept the signals from which sign bits have been removed out of all input signals to the detection circuit, and a second mode to accept the sign bits too and the two modes can be selected by using registers. This arrangement makes the circuit simpler than in the case where the detection circuit is used, and the offset compensation amount, the write current and the optimum sense current can be obtained by substantially the same method.

Further, to improve the reliability of recording and reproduction of a specific data pattern necessary to optimize the above-mentioned parameters, it is possible to reset the pre-coding means just before a sync byte which indicates the start of a data division when recording data. By so doing, the magnetized condition of the data pattern from the sync byte onwards can be specified, and the specific pattern necessary to optimize the above-mentioned parameters can be recorded.

If the present invention is considered a recording method for causing a flux reversal to occur at data "1" and maintaining the write current direction at data "0", such means is used as using a sync byte which starts with "0" at the leading end of data and has no successive data "1" in a sequence of serial data. By this arrangement, it is possible to provide a sync byte which precludes interference with a data pattern written in advance for the AGC and PLL circuits and provides less chances of non-linear distortion in recording. Therefore, the write current, sense current and equalizer coefficients can be detected with relative ease even if they are not optimized.

Further, in addition to the above arrangement, the sync byte is formed such that the sync byte's record code data having a sequence of data "0" and "1" differs for more than ½ of a byte from a sequence of data "0" and "1" recorded before the sync byte. Consequently, it is possible to greatly reduce the probability of mistakenly detecting the data pattern for the AGC and PLL circuits written in advance as if it is a sync byte.

Further, in the present invention, to realize a signal processing circuit less subject to degradation, the target amplitude value of an automatic gain control circuit (AGC) is varied according to set values in registers. By this arrangement, when the resolution of input signal is low, by using a smaller target amplitude value, signals are prevented from being saturated in some parts of the signal processing circuit and, for example, impulse noise can be prevented from affecting signal processing. When the resolution of input signal is high, by increasing the target amplitude value, degradation attributable to the circuit such as circuit noise can be reduced and the BER can be improved.

Further, in the present invention, in a signal processing circuit including a mixture of analog and digital circuits, in which the control circuits of the AGC and the PLL are formed as digital circuits, the entire circuit is formed as a two-chip LSI including analog and digital chips, and outputs of the control circuits of the AGC and the PLL on the digital chip are supplied through current-output type D/A converter circuits via pin terminals to a variable gain amplifier (VGA) and a voltage controlled oscillator (VCO) on the analog chip. In this way, by supplying output data from the digital chip in the form of a current, the influence of noise which may enter the signals from the digital chip itself can be reduced, and the number of pins required can be made substantially smaller than in the case where those signals are output in the form of a digital signal of several-bit codes.

BRIEF DESCRIPTION OF THE DRAWINGS

FIG. 5 shows a diagram showing the amplitude of reproduced output according to the write current and diagrams showing error distributions according to magnitudes of error signal;

FIG. 8 is diagram showing the equalizer circuit and the coefficient compensation circuit in the embodiment of the present invention;

DESCRIPTION OF THE PREFERRED EMBODIMENTS

Preferred embodiments of the present invention in which the present invention is applied to a magnetic disk drive will be described with reference to the accompanying drawings.

Figure 1:
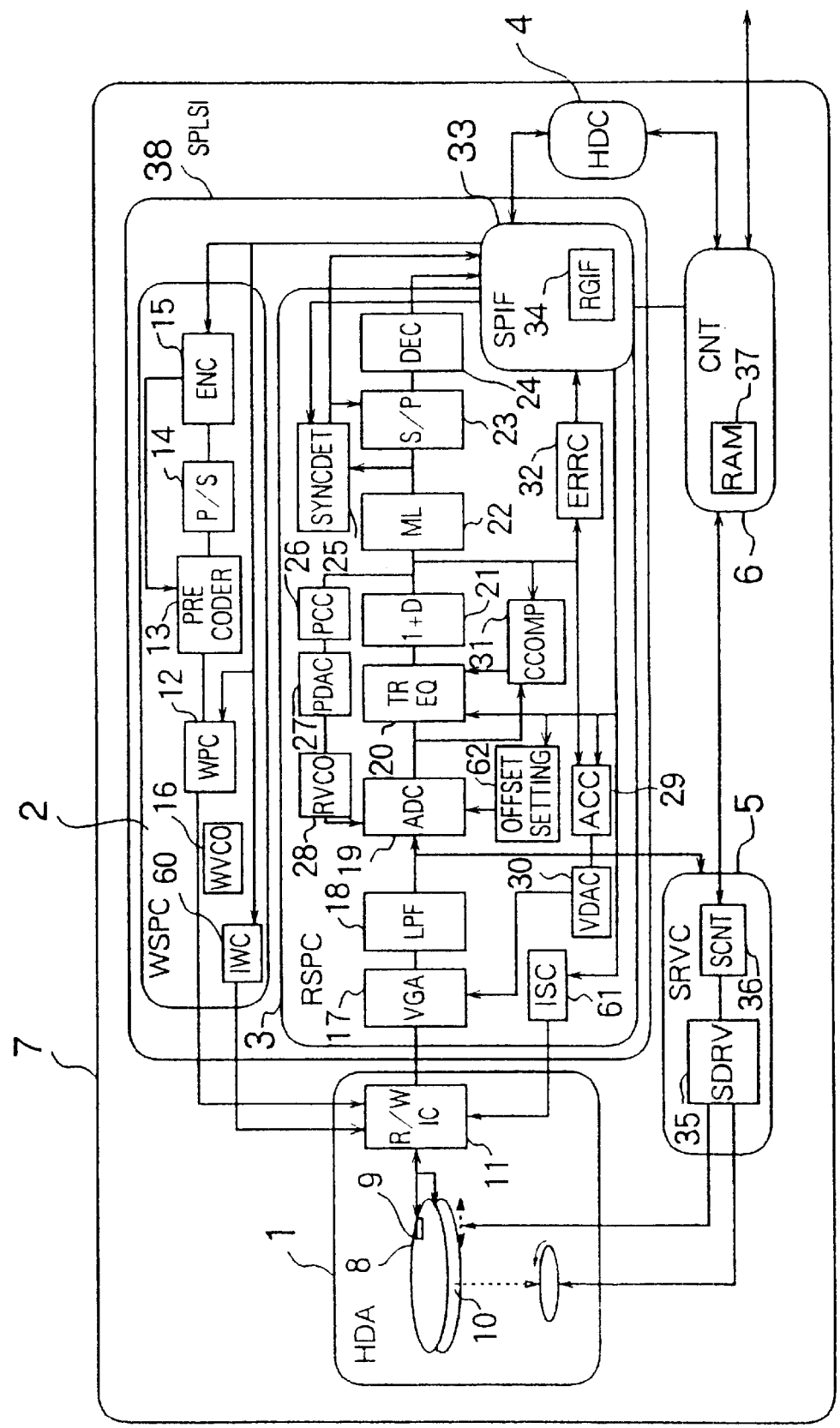
FIG. 1 is a diagram showing an embodiment of the present invention in which the present invention is applied to a magnetic disk apparatus.
Figure 2:
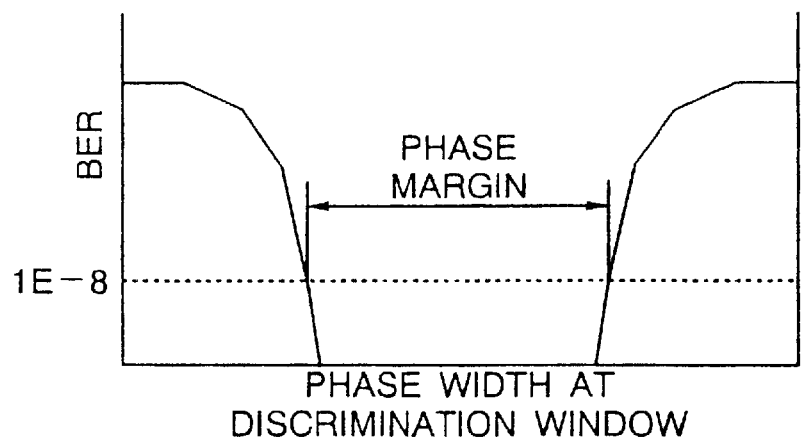
FIG. 2 is a diagram showing measurement results of the phase margin of the magnetic disk apparatus.
Figure 3:
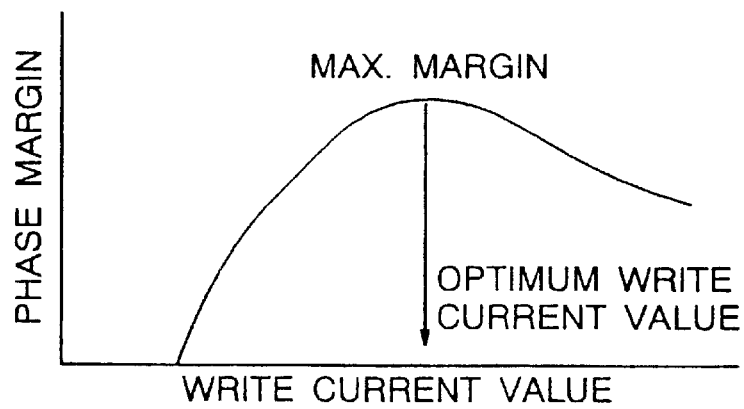
FIG. 3 is s diagram showing a method for deciding an optimum write current according to the measurement results of the phase margin of the magnetic disk apparatus.
Figure 4:
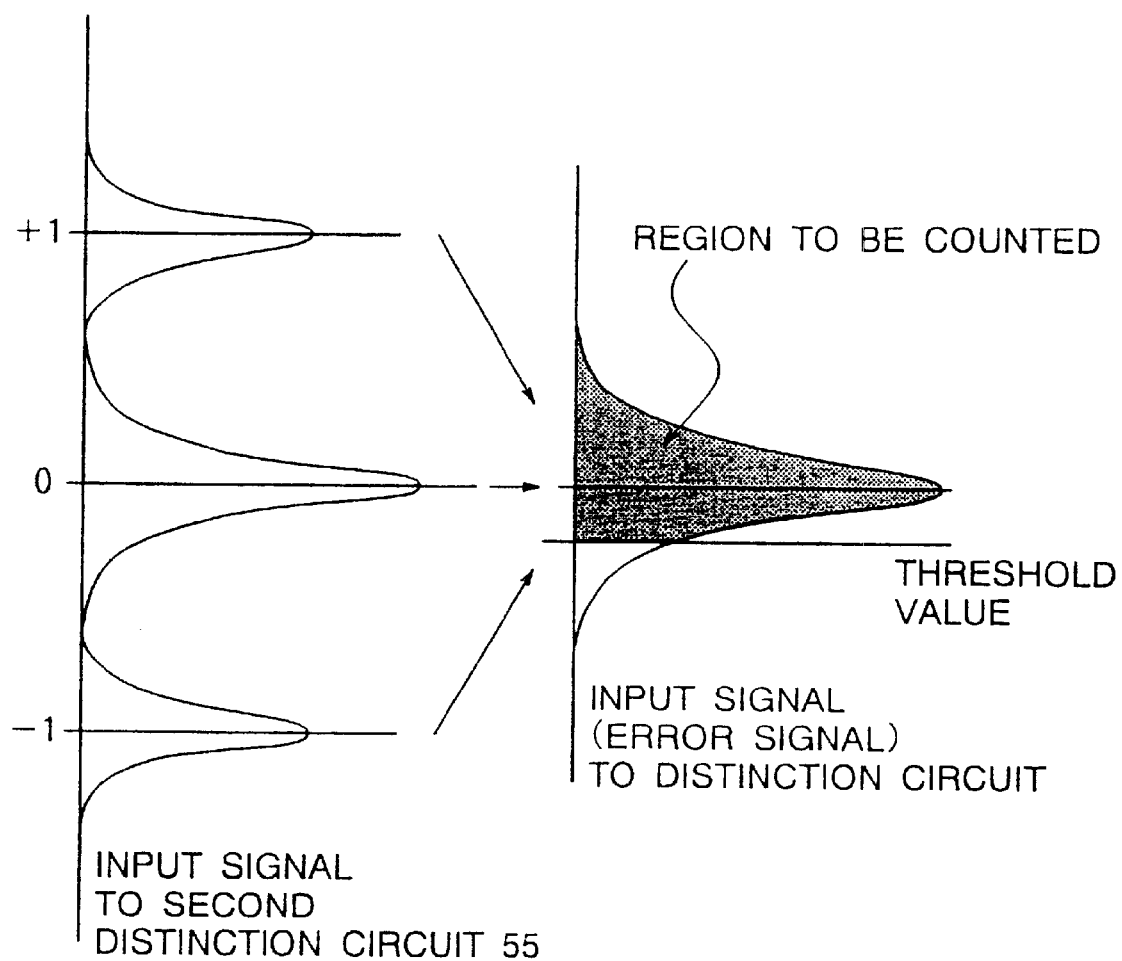
FIG. 4 shows a histogram of the identification circuit according to the present invention and a histogram of error signal.

In FIG. 1, a magnetic disk drive (HDD) 7 according to an embodiment of the present invention is made up of seven main function blocks, including a head disk assembly (HDA) 1, a write signal processing circuit (WSPC) 2, a reproduced signal processing circuit (RSPC) 3, a signal processing interface (SPIF) 33, a head disk controller (HDC) 4, a servo signal processing circuit (SRVC) 5, and an apparatus controller (CNT) 6. For this apparatus, for example, a so-called PRML system is adopted which uses partial response class 4 (PR4) and maximum likelihood (ML) decoding (also known as Viterbi detection).

Each of the above-mentioned components will be described.

The HDA 1 includes a reproducing head (MR head) 8 employing a magnetoresistance effect element, a thin-film recording head (IND head) 9, a read/write preamplifier (R/W IC) 11, and a magnetic disk (DISK). When recording information, a write current which is reversed according to information from WSPC 2 is supplied through R/W IC 11 to IND head 9 and recorded as magnetized information on DISK 10 rotating at a fixed rotating speed. In reproduction, feeble magnetized information detected by MR head 8 is amplified by R/W IC 11 and output to RSPC 3. It is to be noted that the magnitudes of the write current of IND head 9 and the sense current of MR head 9 are controlled by WSPC 2 and RSPC 3, and that the rotation of DISK 10 and positioning of IND head 9 and MR head 8 on DISK 10 are controlled by SRVC 5.

WSPC 2 includes a modulator circuit (ENC; encoder) 15 and a parallel/serial data converter circuit (P/S) 14, a write pre-compensation circuit (WPC) 12, a pre-coder (PRE CODER) 13, synthetizer (WVCO; write voltage controlled oscillator) 16, and a Iw (write current) setting circuit (IWC) 60. Write information from HDC 4 is converted into a form of information suitable for magnetic recording by ENC 15, then further converted by P/S 14 into a serial bit sequence, and pre-coded by PRE-CODER 13. The write current, after having its reversal positions compensated by WPC 12 so that the sequence of bits be recorded at specified positions, is output to HDA 1. Note that the output current value of IWC 60 is controlled by registers (RGIF) of SPIF 33. ENC 15 monitors record information from HDC 4, and each time a sync bite immediately after a preamble and immediately before user data is detected, resets PRE-CODER 13 just before the SYNC byte so that the sync bytes can be recorded in the same magnetized pattern at all times.

RSPC 3 includes an automatic gain control circuit (AGC) including a variable gain amplifier circuit (VGA) 17, an amplitude control circuit (ACC) 29 including an amplitude value detection circuit, and a D/A converter DAC (VDAC) 30 for a current output type; an automatic phase lock loop (PLL) including a voltage controlled oscillator (RVCO) 28, a phase control circuit (PCC) and a D/A converter DAC (PDAC) 27 for a current output type PLL, a programmable filter (LPF) 18, an A/D converter (ADC) 19, a digital transversal type equalizer (TREQ) 20, a (1+D) processing circuit 21, a detection circuit or maximum likelihood decoder (ML) 22, a serial/parallel data converter (S/P) 23, a demodulator circuit (DEC) 24, and a sync byte detection circuit (SYNC DET) 25. RSPC 3 further includes a coefficient compensation circuit (CCOMP) 31, an error detector or counter (ERRC) 32, and a Is (sense current) setting circuit (ISC) 61. The target amplitude of ACC 29 is set by registers in SPIF 33. The present invention is characterized by the constitutions of CCOMP 31, ERRC 32 and TREQ 20 and the relation among those components.

In an ordinary reproducing operation, the reproduced signal from HDA I is equalized into the output waveform of PR 4 as it passes through VGA 17, LPF 18, ADC 19, TREQ 20, and (1+D) 21. Simultaneously with this, the AGC control works so that the output of (1+D) 21 has a fixed signal amplitude, and likewise, the PLL control works so that a sampled phase of output of (1+D) 21 is correct. Moreover, the waveform of PR 4 is discriminated by ML 22, and the output is restored to the recorded user data as it passes through S/P 23 and DEC 24. SYNC DET 25 fixes the conversion timing of S/P 23 when it detects the sync byte mentioned above.

The detailed constitution of TREQ 20 and the constitution and operation of CCOMP 31 and ERRC 32 will be described later. In this embodiment, TREQ 20 and ML 22 are formed by digital circuits, but the present invention can be applied to signal processing circuits using an analog equalizer and an analog ML. However, digital ones are more practical and preferable, one reason for which is the ease of adjustment by arithmetic operations. Hereafter, description will be made chiefly of embodiments in which those circuits of digital type are adopted. LPF 18 may or may not have a booster mechanism.

SPIF 33 includes a scrambler or descrambler, an interface circuit with HDC 4, and a register interface (RGIF) 34 with various circuits. This circuit block transfers data to be recorded or data reproduced to and from HDC 4 in ordinary recording and reproduction. Further, SPIF 33 sets or outputs the register values of the above-mentioned various circuit blocks through interaction with CNT 6.

HDC 4 includes an error correction circuit (ECC), etc. User data is added with ECC code and recorded on DISK 10 as record data, and the ECC is also reproduced together with the user data. By using the reproduced ECC, errors in the user data are detected and corrected.

SRVC 5 includes a servo position information peak holding circuit (P/H), a head seek and disk rotation control circuit (SCNT) 36, and a servo driver (SDRV) 35. In response to commands from CNT 6, SRVC 5 analyses the reproduced waveform of LPF 18 and controls head seek and disk rotation.

CNT 6 includes controlling of a communication control (BUSC) for controlling communications with apparatus bus, and also includes controllings of HDA 1, WSPC 2, RSPC 3, SRVC 5, and so on. Chiefly in accordance with write and read commands from a host computer to which the magnetic disk apparatus (HDD) according to this embodiment is connected, CNT 6 controls the circuit blocks in HDD 7.

In this embodiment, of those circuits, all of WSPC, RSPC and SPIF and a part of SRVC are included in the signal processing LSI (SPLSI) 38.

With reference to FIG. 8, the constitutions of the equalizer 20 and the coefficient compensation circuit 31 will be described.

A register 42 for setting tap coefficients in the equalizer (TREQ) 20 will first be described. In the seven-tap transversal type equalizer (TREQ) 20, of the tap coefficients of the equalizer 20 (K0, K±1, K±2, K±3), the center tap (K0) has its coefficient fixed at K0="1" and the tap coefficients (K±1) adjacent on both sides to the center tap are set at the same value (K+1=K-1) and therefore a common register is used. Note that the embodiment in FIG. 8 is described using a case of seven taps as an example, but as has been described, the number of taps may be any number from five or greater. In this embodiment, seven taps are used in anticipation of such an occasion that the channel density of signals to be input to the equalizer is S=PW50/Tb>2. Reference numeral 39A denotes delay elements, 40A denotes multipliers and 41A denotes an adder. Obviously, it is possible to add together two data at tap positions corresponding to the same tap coefficient and then multiply the output of ADC by the sum of those data in one multiplier.

The coefficient compensation circuit (CCOMP) 31 includes a simplified detection circuit (SDET) 43 for outputting only plus and minus signs of the respective bits of the input signal (ADC output) to the equalizer (TREQ) 20; a detection circuit (DET) 44, formed by a comparator, for example, to receive the output signal from (1+D) 21 as an input signal; an adder 41B working as an error calculating circuit for calculating an error signal e from input and output signals of the detection circuit 44; delay elements (DLY) 39B for delaying the output signal of the simplified detection circuit (SDET); and a delta-value calculation circuit for new coefficients (DELTACAL) 45 for compensating the coefficient compensation amount from a correlation value between the output signal of the delay elements 39B and the output signal e of the error calculating circuit 41B. The output signals of the delay elements corresponding to the tap coefficients K+1 and K-1 are added together by the adder 41C and input to the DELTACAL's 45.

Description will now be made of the operation of the equalizer (TREQ) 20 and the coefficient compensation circuit (CCOMP) 31 in coefficient compensation. The coefficient compensation circuit (CCOMP) 31 is used to compensate tap coefficients of TREQ 20 so that PR4 (partial response class 4 equalization) can be done accurately by output of the (1+D) 21, but this CCOMP 31 is not operated in an ordinary reproduction process.

The coefficient compensation is carried out by the following procedure. A random-like data pattern is recorded in a proper area on the magnetic disk. Then, with CCOMP 31 put into operation, this random-like data pattern is reproduced. Consequently, the input signal (ADC output signal) to the equalizer circuit 20 and the signal supplied from the equalizer circuit 20 and processed by the 1+D circuit (namely, the 1+D output signal) are input sequentially into the CCOMP 31. The ADC output signal is coded by SDET 43 and the output is shifted by the delay elements 39B sequentially. At this time, the error signal e calculated by the detection circuit 44 and the adder 41B and output of the delay elements 39B are input to the DELTACAL's 45, thereby correcting the tap coefficients of the coefficient registers 42. The tap coefficients of the TREQ 20 are compensated sequentially while the CCOMP 31 is in operation.

At this time, of the tap coefficients of the equalizer 20, the tap coefficients (K±1) adjacent on both sides to the center tap have great influence on the amplitude characteristics and the phase characteristics. If the coefficients are set to allow K+1≠K-1 in the process of sequential coefficient compensation, the equalizer 20 itself assumes phase characteristics. In consequence, the locked phase (sampling timing of ADC 19) of the automatic phase lock circuit (PLL) shown in FIG. 1 suffers a phase shift. The coefficient compensation circuit (CCOMP) 31 now decides the phase characteristics regardless of the PLL, so that the phase characteristics are not fixed and the coefficient values decided by CCOMP 31 do not become stable. If the sampling timing is shifted excessively, errors at the output of the equalizer increase, and when the balance between the tap coefficients K+1 and K-1 is disturbed too much, the phase of the PLL is unlocked.

According to this embodiment, as a condition of K+1=K-1 is added, changes of the phase characteristics hardly occur which would be caused by an imbalance of the tap coefficients of the equalizer in the coefficient compensation process. Consequently, contention with the phase characteristics of the automatic phase lock circuit is avoided, making it possible to perform coefficient compensation with high accuracy even with a coefficient compensation circuit of the sequential compensation type. The arrangement for the coefficient of the center tap to be fixed at "1" is also instrumental in avoiding the contention with the automatic gain control circuit (AGC).

As the algorithm for coefficient compensation, for example, a generally known CLMS (clipped least mean square) can be used.

Figure 9:
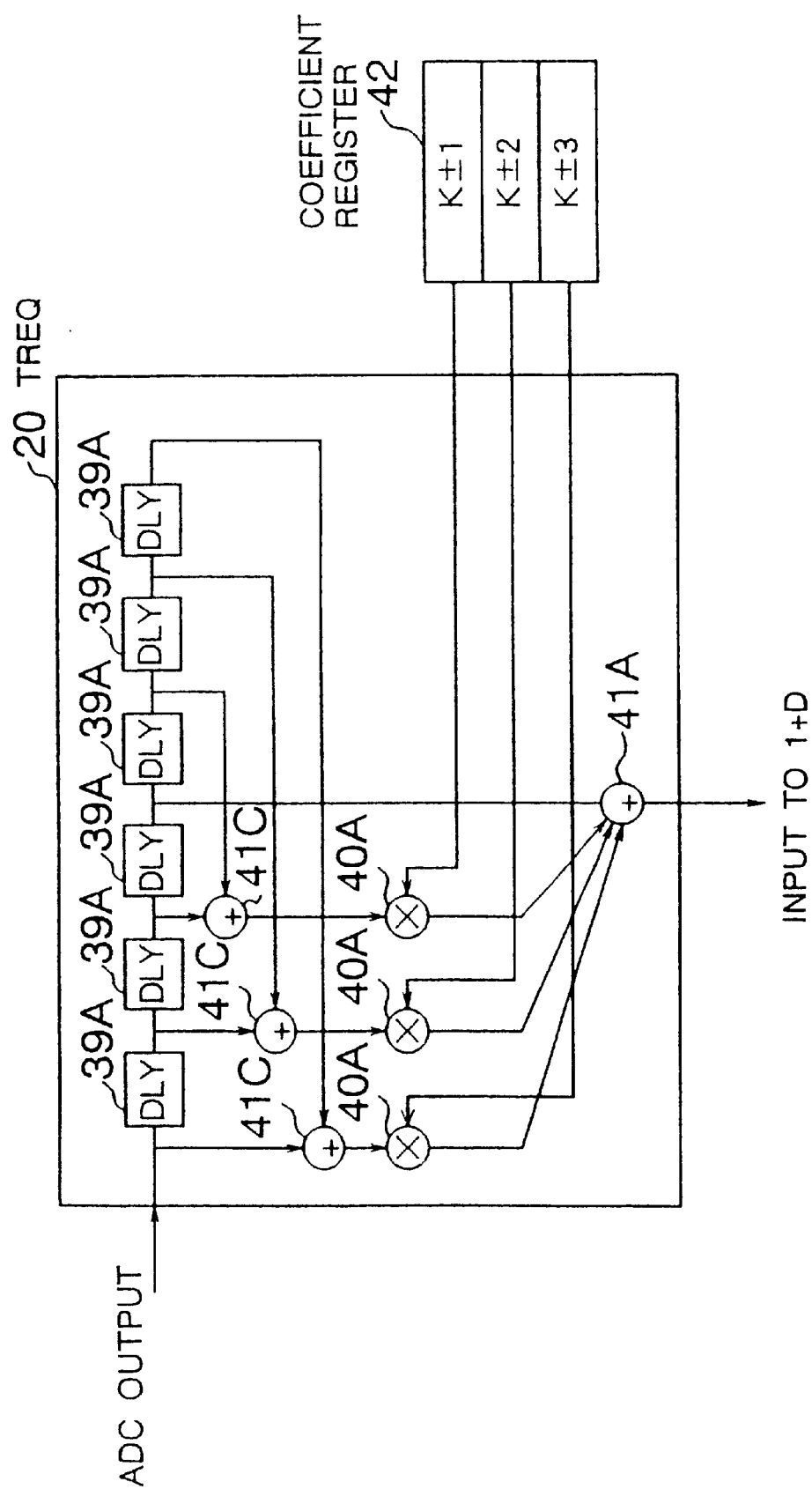
FIG. 9 is a diagram showing a modification of the equalizer circuit in the embodiment of the present invention.

A modification of the equalizer 20 in the present invention will now be described with reference to FIG. 9.

In this modified embodiment, a seven-tap transversal type equalizer 20 is used. Of the tap coefficients in the coefficient register 42 of the equalizer 20, the tap coefficients (K+1 and K−1, K+2 and K−2, K+3 and K−3) at positions symmetric with respect to the center tap are arranged to have the same value. Data at the latter-half tap positions are added with data at the former-half tap positions by adders 41C and are input to multipliers 40A.

According to this embodiment, the scale of the register 42 can be reduced. In addition, no contention occurs at all between the equalizer 20 and the PLL in terms of phase characteristics in the coefficient compensation process of the equalizer 20. The CCOMP 31 at this time can compensate one coefficient by an average or mean correlation signal obtained by adding a plurality of data latched in the delay elements 39A, so that the coefficient compensation can be performed with sufficient stability. The CCOMP 31 in this modified example has about half as many as the coefficients to be compensated in the case where all taps are asymmetric, and therefore the scale of its circuit can be about half as large. Also, the circuit scale of the equalizer circuit 20 itself can be about half as large because the number of the multipliers 40A, which are the largest components, can be about half as many.

Note that the front-back symmetry Tas of the input waveform (solitary waveform) corresponding to a solitary magnetization in which this modification is effective is 7% or less, and if this is exceeded, even when the number of taps is increased, the equalizer circuit cannot exhibit its performance sufficiently, which results in a considerable deterioration of the apparatus performance.

If the leading edge of the mesial-point width PW50 is designated as T1 and the trailing edge is designated as T2, the font-back symmetry Tas of a solitary waveform is defined as:

$$Tas=|T1-T2|/PW50$$

$$(PW50=T1+T2)$$

Figure 10:
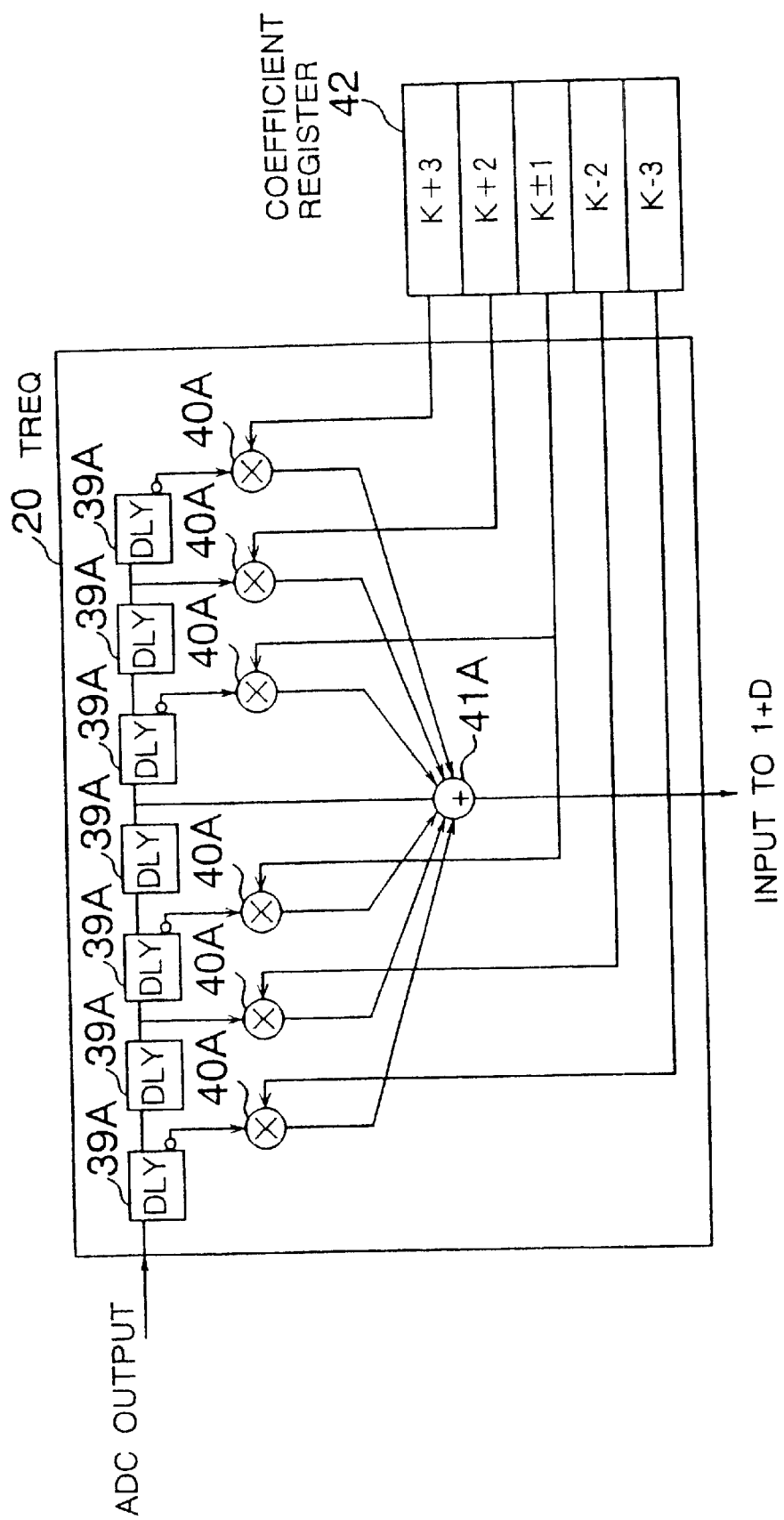
FIG. 10 is a diagram showing another embodiment of the equalizer circuit in the embodiment of the present invention.

FIG. 10 shows yet another embodiment of the equalizer circuit 20.

In this embodiment, a seven-tap transversal type equalizer circuit 20 is used and arranged such that negative coefficients of the equalizer circuit 20 are set by using positive coefficients, that is, by inverting outputs of the delay elements 39A.

In the case of waveforms having their foot portion shaped in a relatively monotonous form like in reproduced waveforms of solitary magnetizations in magnetic recording, when the transversal equalizer circuit equalizes such a waveform, the tap coefficients have their signs alternate in such a manner as minus, plus, minus, plus, and so on as they move toward both sides if the sign of the coefficient at the center tap is positive.

According to this embodiment, it is possible to invert and output data at tap positions that can be estimated to be negative coefficients and, as a result, the need for the signs for the coefficient bits of the equalizer circuit is obviated, and the circuit scale of the equalizer circuit can be reduced. In addition, the scale of the registers for setting coefficients can be reduced. Obviously, the same results can be obtained if the signs of the coefficient values are inverted.

Figure 11:
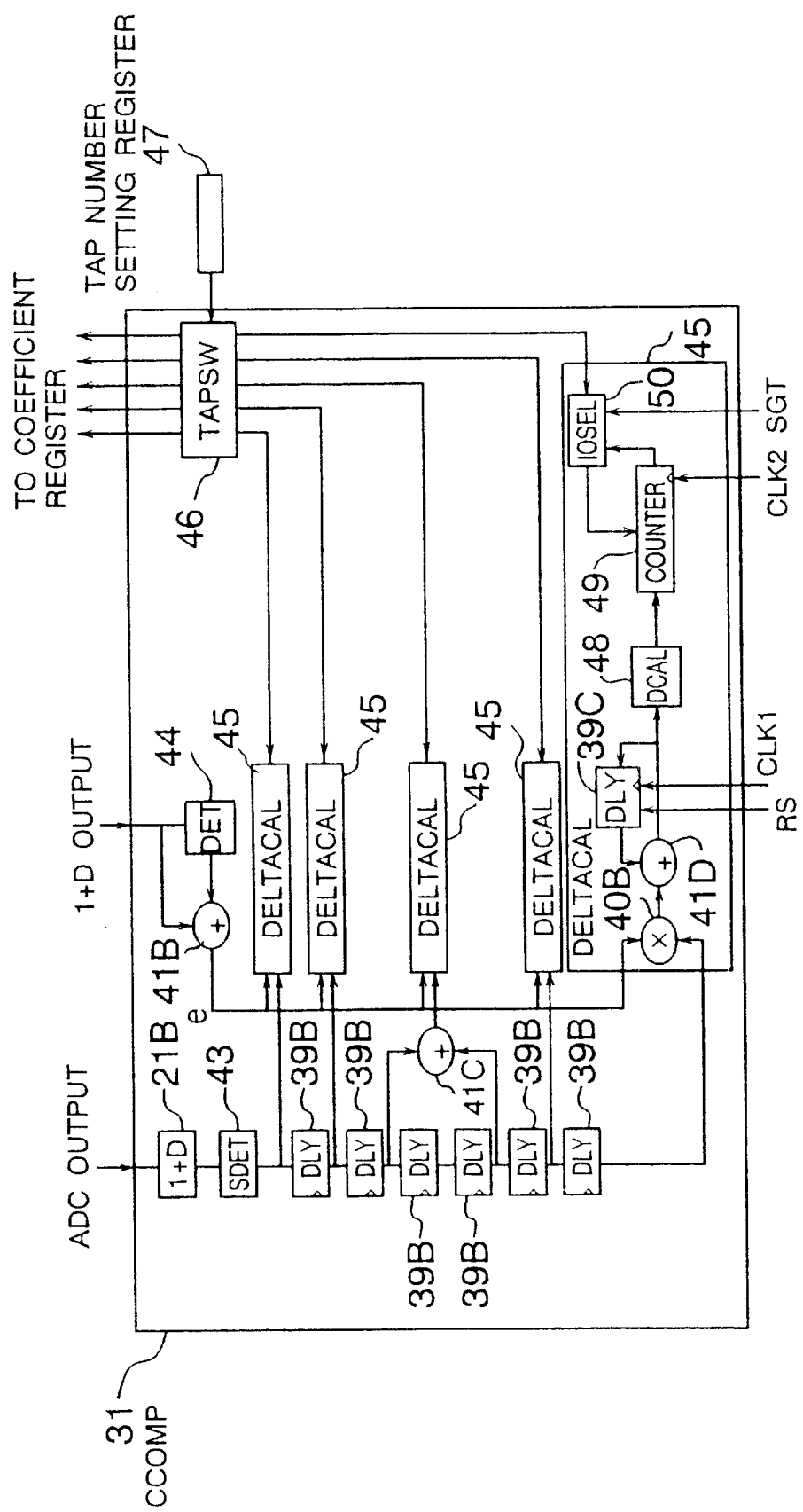
FIG. 11 is a diagram showing detail of the coefficient compensation circuit in the embodiment of the present invention.

The constitution and the operation of the coefficient compensation circuit (CCOMP) 31 in this embodiment will be described in detail with reference to FIG. 11.

The CCOMP 31 according to this embodiment includes a simplified detection circuit 43 for, after the input signal of the equalizer circuit 20 (ADC output) is (1+D)-processed by the (1+D) processing circuit 21B, outputting only the plus and minus signs of the bits of the signal; an adder 41B functioning as an error calculating circuit for calculating an error signal e from the output signal of the (1+D) circuit and the output signal of the detection circuit 44 formed of a comparator; a group of delay elements 39B for delaying the output signal from the simplified detection circuit 43; a multiplier 40B functioning as a correlation value calculating circuit for calculating a correlation value between the output signal of the group of delay elements 39B and the output signal e of the error calculating means; an adder 41D functioning as a correlation value adding circuit for sequentially adding up, by using a delay element 39C, the output signals of the multiplier 40B; a coefficient compensating direction calculating circuit (DCAL) 48 for calculating a coefficient compensation amount according to a signal from the adder 41D, which is a sum of additions a fixed number of times; a coefficient error compensation circuit (COUNTER) 49 formed of an up-down counter, for example, for compensating the coefficient value of the equalizer circuit by the output signal of the DCAL 48; a coefficient input/output selector (IOSEL) 50 formed of a switch to control input and output of the coefficient values; and a tap number switch (TAPSW) 46.

The correlation value calculating circuit (adder) 41D according to this embodiment stops sequential additions of correlation values for a fixed period of time after coefficient compensation is carried out. To be more specific, in the adder 41D, additions are performed sequentially in step with the addition clock CLK 1 which occurs at the same rate as the data periods or cycles. Added-up data is converted into an up/down signal of the COUNTER 49 by DCAL 48. After additions are performed 32 times in step with CLK 1, an up/down signal is received by COUNTER 49 in step with CLK 2, and the tap coefficient value, supplied to COUNTER 49 by the action of IOSEL 50, is updated. The updated tap coefficient value is reflected to the equalizer circuit 20 by the action of IOSEL 50 and in response to a gate signal SGT. At this moment, however, the (1+D) output signal to be supplied to the CCOMP 31 does not immediately reflect the just updated coefficient value, so after the elapse of a fixed period of time (e.g., a total delay time of the equalizer circuit 20 and the (1+D) processing circuit 21), a reset signal RS is sent to the correlation value adder 41D to let the adder 41D discard the addition information about a correlation value related to a tap coefficient value not yet updated. By a setting value of the tap number setting register 47, the TAPSW 46 is controlled so as not to perform coefficient compensation at tap positions of coefficients K±3 of the seven-tap transversal type equalizer circuit 20 when the tap number 5 is set. In this case, the coefficients K±3 are always set at "0" and the operation of the section related to coefficient compensation corresponding to coefficients K±3 is stopped.

According to this embodiment, correlation data is not obtained while coefficients are being compensated, but by providing a halt period, correlation data is accumulated invariably under a fixed tap coefficient value. Therefore, no oscillatory errors occur attributable to the loop delay (delay by TREQ 20 and CCOMP 31) which tend to occur when CLMS (clipped least mean square) and LMS (least mean square) operations are performed which are conventional coefficient compensation algorithms. The coefficient compensation circuit is essentially an open loop circuit, and therefore can perform signal processing steps such as averaging (corresponding to the correlation value calculating means in this embodiment) a sufficient number of times (32 times is specified in this embodiment, but in fact any number of times is possible) without regard to the loop delay, thus holding great promises for higher accuracy in coefficient compensation. Moreover, in this embodiment, because a plurality of tap coefficients are updated simultaneously, the time to convergence is short. Though the time depends on the number of additions performed, the coefficients converge sufficiently by the amount of learning as long as about one sector (several thousand bits).

If the signal input to the equalizer circuit is received with a relatively high resolution and shows good symmetry, the number of taps provided can be reduced. According to this embodiment, signal equalization can be performed with desirable coefficients which do not give rise to coefficient truncation errors compared with a case where the coefficients are obtained by seven-tap compensating the coefficient compensation with only the coefficients at the two extreme ends set at "0", are applied to the equalizer circuit. In addition, outputs at the gates where the tap coefficients are set at "0" are fixed and not switched, the current consumed in those areas is reduced, so that the total power consumption of the circuit can be reduced.

In this embodiment, the input signal (ADC output) to the equalizer circuit 20 is subjected to a partial response process (1+D process) 21 and then supplied to the coefficient compensation circuit (CCOMP) 31, but obviously this 1+D process need not be included in the CCOMP circuit as shown in FIG. 8. Output of the simple detection circuit (SDET) 43 is not restricted to sign bits, and may be data of several bits.

The signal to noise ratio of the correlation signal can be improved by calculating a compensation amount from a correlation signal between an error signal supplied by DET 44 and a signal obtained by subjecting the input signal of the equalizer circuit 20 to a partial response waveform process and then to a simplified detection process (SDET 43). Consequently, the convergence of coefficient compensation is improved, so the need for means for storing the data pattern is obviated.

According to this embodiment, coefficient compensation using a random, arbitrary data pattern is possible, and coefficient compensation at the user site is also possible. Therefore, in such a case where the characteristics of the head and the recording medium change with time, if coefficient compensation is carried out when power is turned on, for example, it is possible to maintain the optimum equalizer circuit condition on the apparatus at all times. Because a data pattern which is necessary for the coefficient compensation circuit to carry out coefficient compensation is not specified, means to store a data pattern need not be mounted inside or outside the apparatus, so the circuit scale can be reduced.

In magnetic disk apparatuses, generally the combination of the disk and the head remains unchanged, and therefore, it is often possible for the magnetic disk apparatus to maintain its sufficient performance only if coefficient compensation is carried out before the apparatus is shipped even if coefficient compensation is not carried out at the user site. In this case, it is possible to erase the random data pattern (training area) for coefficient compensation on the magnetic disk, which was used when the coefficients were compensated, and ship the apparatus. This training area can be used as the storage area for user data, so the format efficiency of the apparatus can be improved.

Figure 12:
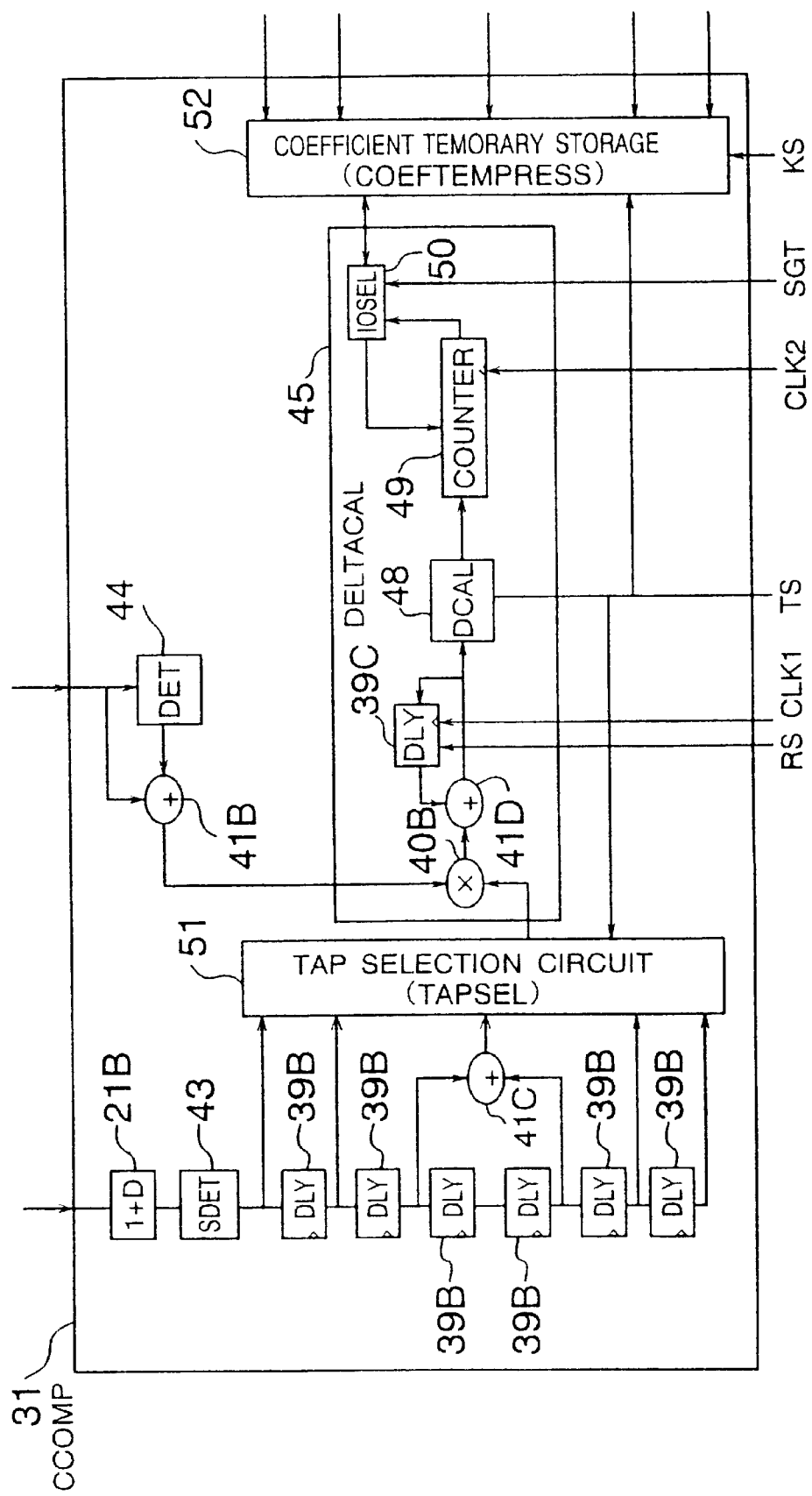
FIG. 12 is a diagram showing a modification of the coefficient compensation circuit in the embodiment of the present invention.

A modification of the coefficient compensation circuit (CCOMP) 31 will be described with reference to FIG. 12.

In this embodiment, the coefficient compensation circuit includes a selection circuit (TAPSEL) 51 formed of switches to select the tap coefficients to be compensated; a coefficient compensation amount (delta-value) calculation circuit for new coefficient (DELTACAL) 45 described in detail with reference to FIG. 11; and coefficient temporary holding circuit (COEFTEMPRSS) 52 formed of registers. The selection circuit (TAPSEL) 51 operates in an interlocked manner with the coefficient temporary holding circuit 52, and when the compensation amount for each tap coefficient value is calculated, the TAPSEL 51 selects specified tap positions. The order of selection of the tap positions is from those closer to the center to remoter ones (the order is basically not specified). When the coefficient values for those taps are set in the coefficient temporary holding circuit by controlling the TAPSEL 51, all the tap coefficients are set in the coefficient registers 42 by signal KS.

According to this embodiment, as described with reference to FIG. 11, the coefficient compensation circuit 31 according to the present invention is essentially formed as an open loop. Therefore, if the linearity and the randomness of the signal input to the equalizer circuit 20 are guaranteed, the respective tap coefficients need not be compensated by the same information (simultaneously). As shown in this embodiment, the tap coefficients can be compensated in a time sharing manner by using the selection circuit 51 and the coefficient temporary holding circuit 52 and, as a result, the circuit scale can be reduced substantially.

Figure 13:
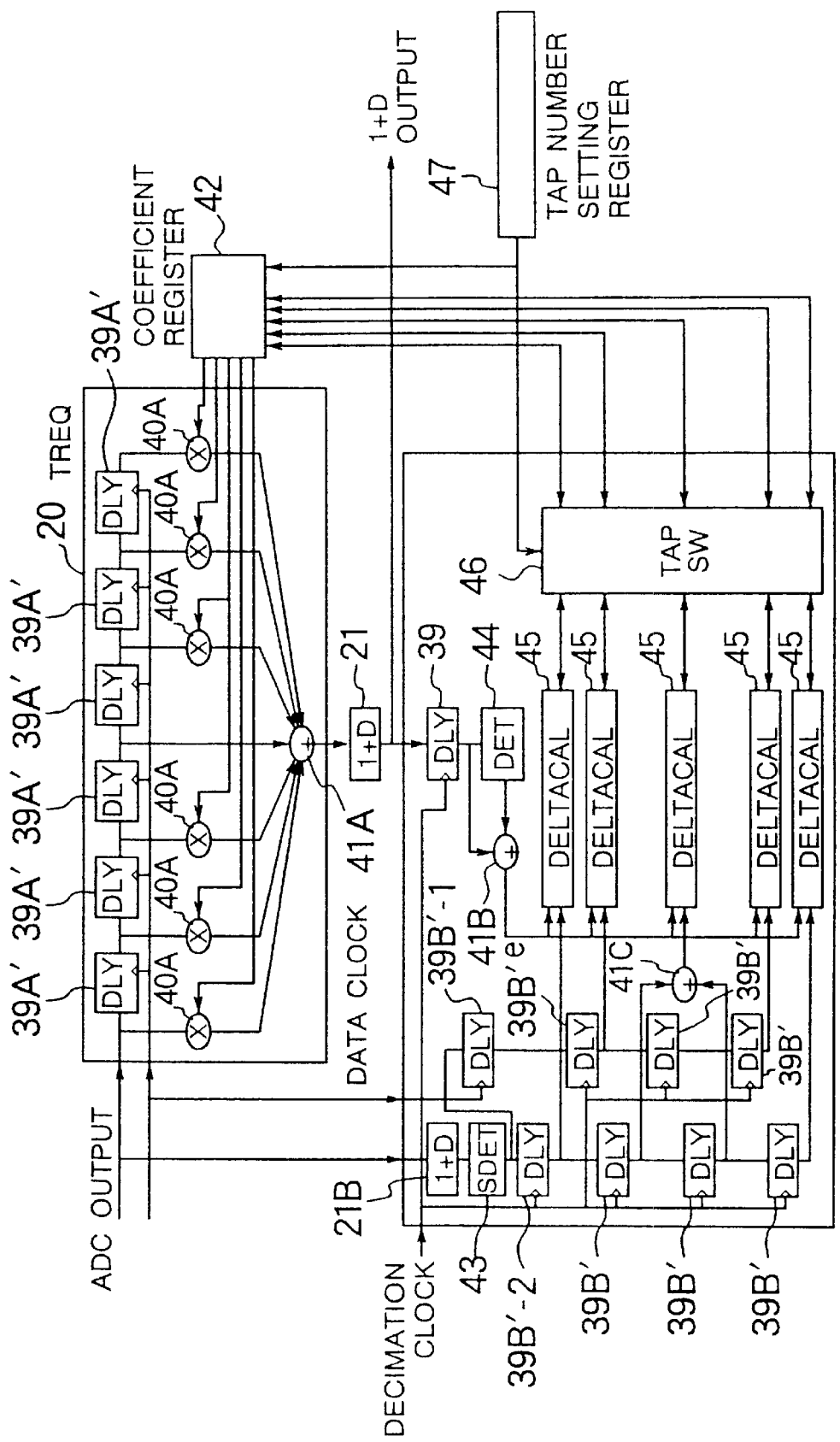
FIG. 13 is a diagram showing another embodiment of the coefficient compensation circuit in the embodiment of the present invention.

Another embodiment of the coefficient compensation circuit (CCOMP) 31 will be described with reference to FIG. 13.

In this embodiment, the CCOMP 31 of the equalizer circuit 20 receives the output signal of ADC 19 and operates in step with a decimated clock. Note that the output signal of ADC 19 is the input signal of the coefficient compensation circuit 31 of the equalizer circuit 20 which is formed by replacing the delay elements 39A with latches 39A'. The decimation number in this embodiment is 1, and the frequency of the decimation clock is ½ of the data clock frequency. There are two systems: one system where output of SDET 43 is first latched by a latch 39B'-1 in step with the data clock and then decimated, and the other system where the output of SDET 43 is directly decimated and latched by a latch 39B'-2. Reference numeral 39B' denotes latches by which input signals corresponding to the tap positions of the TREQ 20 can be obtained in step with the decimation clock.

As described above, the coefficient compensation circuit according to the present invention is only required to supply error signals between input and output signals of the equalizer circuit, which correspond to the respective tap coefficient positions. Therefore, the error signal between the input and output signals of the equalizer circuit need not necessarily be continuous but may be decimated as proposed in this embodiment.

According to this embodiment, by decimation, the operation frequency of the coefficient circuit cane be reduced to 1/(decimation number+1), so that power consumption during a coefficient compensation operation can be reduced substantially without increasing the scale of the circuit.

Figure 14:
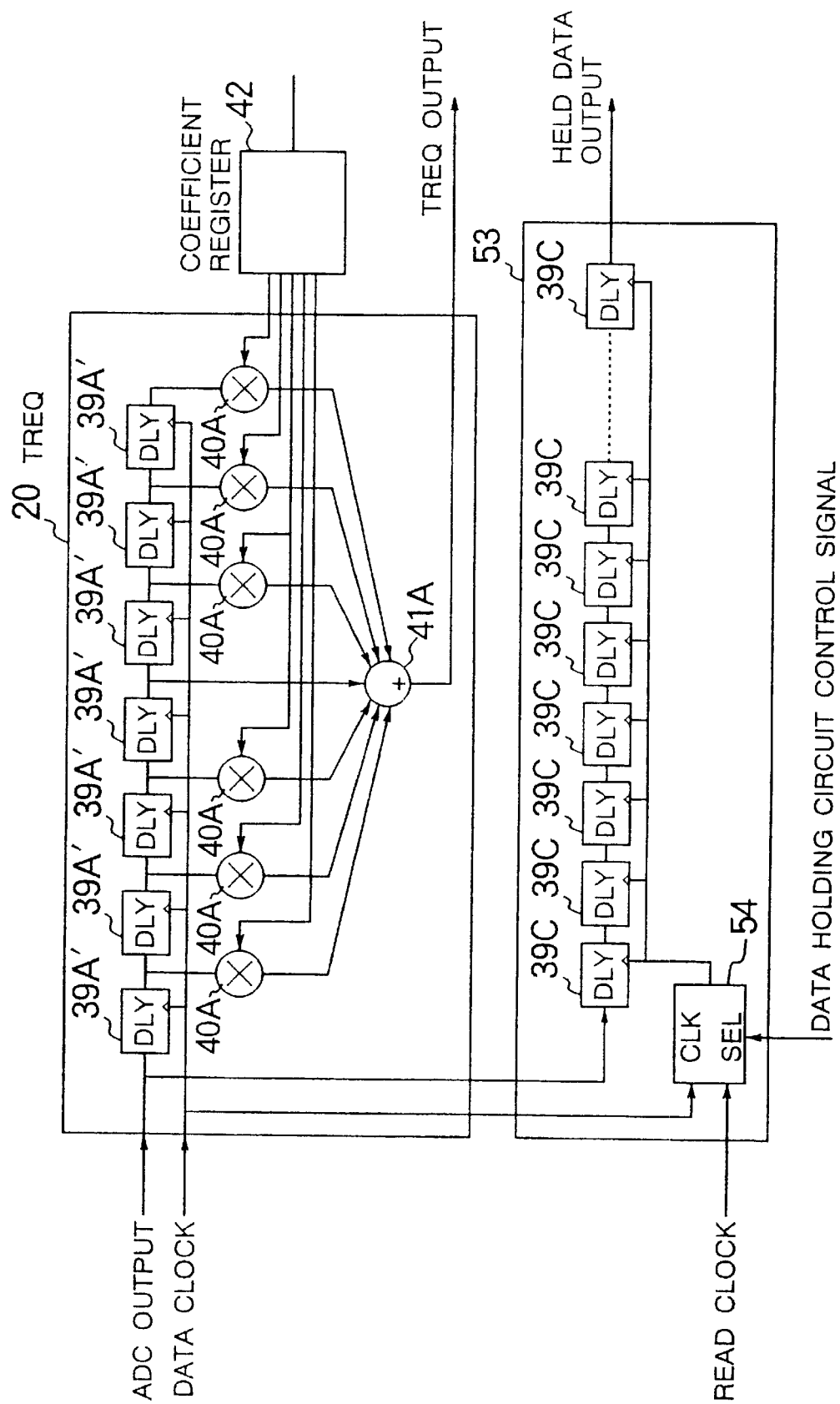
FIG. 14 is a diagram showing a modification of the coefficient compensation circuit in the embodiment of the present invention.

A modification of the means for obtaining the coefficients will be described with reference to FIG. 14.

In this embodiment, the coefficient compensation of the equalizer circuit is carried out outside and the coefficient compensation circuit 31 is not used.

In this embodiment, the equalizer circuit is provided with a data holding circuit 53 formed of latches 39C' for holding a signal input to the transversal type equalizer circuit 20 (namely, output of ADC 19) for a data segment having a length twice or more longer than a total of taps of the equalizer circuit in time with the data clock, and also a selection circuit (CLKSEL) 54 formed of a switch to output, to the outside, data held in the data holding circuit 53 by switching from the data clock to another clock (a read clock).

Beside the above-mentioned sequential compensation method, there is another method for obtaining tap coefficients of the equalizer circuit 20. This method is to serially store a considerable amount of the input signal of the equalizer circuit, and give a sequence of ideal output corresponding to the sequence of the input signals to thereby obtain coefficients of the generally known Wiener filter (a filter with a tap coefficient for minimizing the square error). By applying this embodiment, it is possible to take out the held data and obtain an optimum solution by using an external personal computer, a controller CNT 6 in a magnetic disk apparatus and so on to perform a matrix operation.

According to this embodiment, the data segment length of the data holding circuit 53 can be reduced to about twice the number of taps of the equalizer circuit by making contrivance to the pattern or the like, so that the circuit scale can be made smaller than in a case of forming a coefficient compensation circuit. However, a longer data segmentation length reduces the effects of noise, and obviously helps to obtain better tap coefficients.

Figure 15:
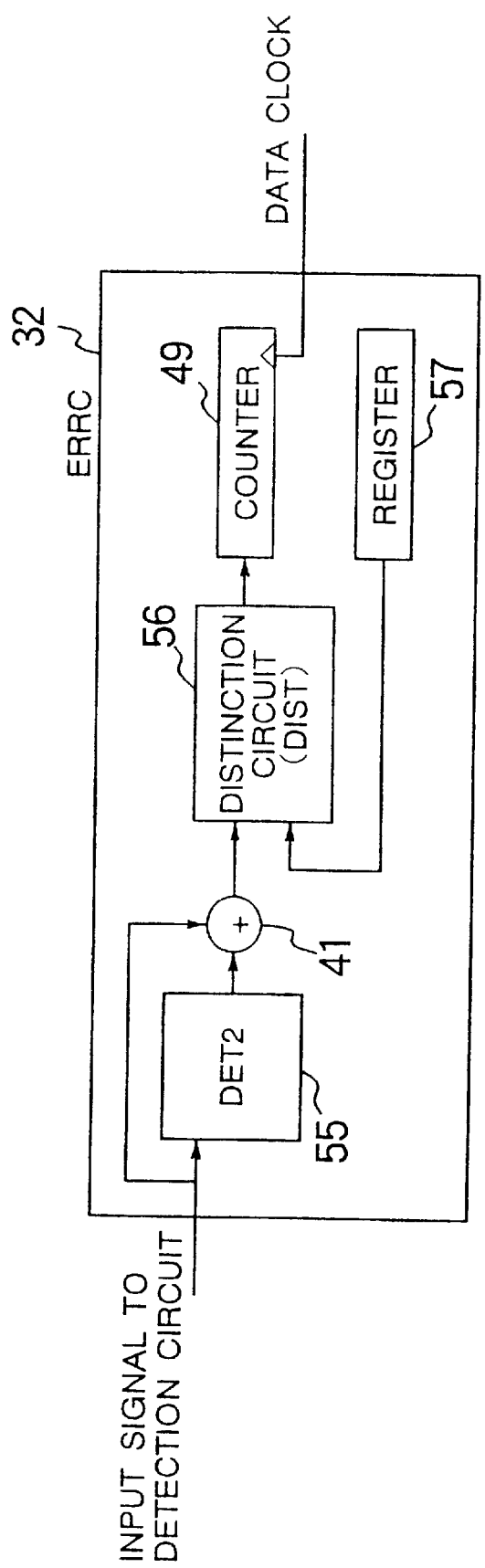
FIG. 15 is a diagram showing the error detection circuit in the embodiment of the present invention.

With reference to FIG. 15, description will now be made of the error detection circuit (ERRC) 32 instrumental in optimizing the parameters in this embodiment.

The ERRC circuit 32 includes a second detection circuit (DET2) 55 formed of a comparator, for example, for receiving the same input signal as the input signal to the detection circuit (ML) 22, an adder 41 serving as the error calculating circuit for calculating an error signal in the second detection circuit 55 from the input signal to and the output signal from the second detection circuit 55, a distinction or decision circuit (DIST) 56 formed of a comparator, for example, for outputting a count signal when an error signal is larger than a fixed threshold value set in a register 57, and a counter 49 for counting count signals.

The error signal between the input signal to the detection circuit (ML) in the signal processing circuit and the target amplitude at the equalizer circuit is obtained by using the second detection circuit 55 and the error calculating circuit (adder 41). This error signal is compared with a fixed threshold value set in the above-mentioned distinction circuit, and if the error signal is larger than the threshold value, a distinction output is at the "1" level and if not, the distinction output goes to the "0" level. The above-mentioned counter increments only when output of the distinction circuit is "1". In this embodiment, the DET2 is indicated as a detector of every bit, but the ML22 shown in FIG. 1 may be used instead of the DET2.

The error signals in the error detection circuit are distributed on both the positive and negative sides with "0" as the center of distribution and in a substantially normal distribution. Therefore, the ratio of the count value to a total population parameter is decided by the variance value of the error signals and the threshold value of the distinction circuit. In other words, if the total population parameter, a threshold value and a count value are decided, the variance value of the error signal can be obtained. Because generally the performance (BER) of the detection circuit in the apparatus is decided by the quality of signal (the variance value for example) input to the detection circuit, the BER of the apparatus can be estimated by finding the variance value.

When the parameters are to be optimized, if differences in the variance values can be detected by varying the setting values of the parameters, this is enough. If the factors governing the apparatus performance are sampled separately and the parameter values at which the errors (variance value) are smallest are obtained, the parameters can be optimized.

According to this embodiment, a necessary population parameter (number of samples) for achieving the accuracy of the ratio of the count value to a total population parameter of one to two percent is several thousands, so that the amount of information as many as several hundred bytes (about one sector) is enough. Therefore, compared with the conventional method of optimization by measurement of BER, the required time is about one-one hundred thousandth ($\frac{1}{100,000}$). For this reason, optimization of a larger number of parameters can be performed in a relatively short time, so that the performance of the apparatus is thereby expected to improve. It is expected that a reduction of adjustment time contributes to a reduction of the apparatus cost.

If an output monitor or the like is added to the equalizer circuit, the error detection circuit can be installed external to the apparatus as a tool for adjusting the magnetic disk device.

Figure 16:
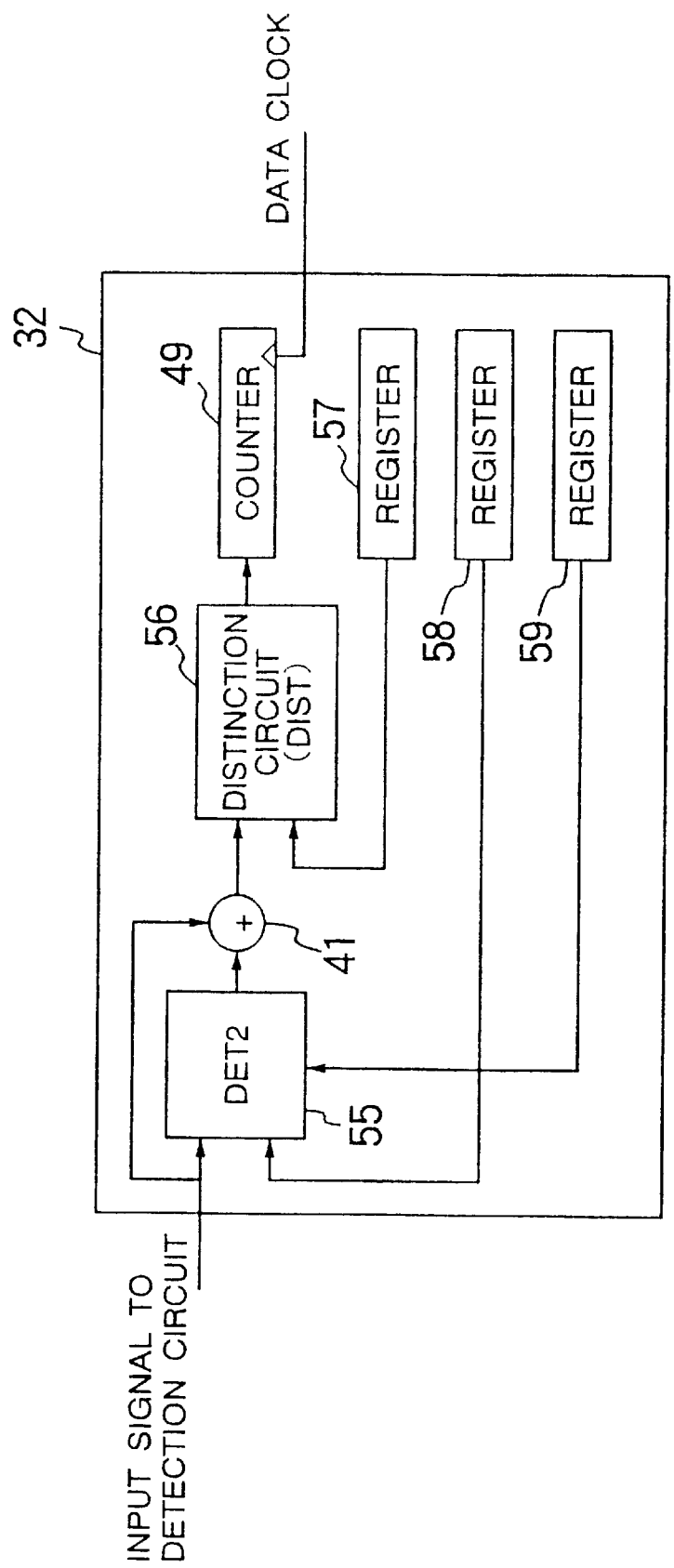
FIG. 16 is a diagram showing a modification of the error detection circuit in the embodiment of the present invention.

In the embodiment mentioned above, the detection level in the comparison in the detection circuit 55 has been described as fixed, but a variation of the present invention can be made such that the detection level of the second detection circuit (DET2) 55 shown in FIG. 16 can be set arbitrarily in the detection level register 58.

If it is possible to arbitrarily set the detection level of the second detection circuit 55 in the error detection circuit, detection with a varying threshold value becomes possible, and then the following advantages can be offered. Normally, the second detection circuit 55 has binary detection levels of +0.5 and −0.5 to detect three values of +1, 0 and −1. For example, if a data pattern which can take only two values of +1 and −1 as the output data pattern of the equalizer circuit is to be detected, detection errors are likely to occur at the above-mentioned detection level depending on the magnitude of error and noise.

According to this embodiment, if the threshold value (value set in the detection level register) is set close to "0", the detection circuit can be operated as a substantially binary detector, so that the detection performance improves (the antinoise performance improves twice higher than before) and a more accurate value of error signal can be obtained. Therefore, more accurate optimization of the apparatus can be performed.

As shown in FIG. 16, a plurality of detection levels can be set for the second detection circuit (DET2) 55 by adding a register 59.

If the second detection circuit 55 can be operated as a detection circuit for binary output (+1, −1) with one threshold value (0), the detection performance with data of a specific data pattern can be improved (the antinoise performance can be improved twice higher). In this embodiment, the register 59 is used to set the number of detection levels (0, 1, 2) of the second detection circuit 55. When the number of detection levels is '2' as set in the register 59, the DET2 operates as a detection circuit to supply ternary outputs (+1, 0, −1) with reference to positive and negative threshold values obtained from a value set in the register 58 (for example, threshold values are −0.5 and +0.5 if the register 58 has a value of 0.5), when the number of detection levels is "1", the DET2 operates to supply binary outputs (+1, −1) with reference to a threshold value of 0 regardless of the register 58, and when the detection level is "0", the DET2 operates to output "0".

According to this embodiment, the detection level can be set arbitrarily only by the register 58. By using the registers 58 and 59, the error signal can be obtained with higher accuracy. When the detection level is set at "0", the input signal to the LML 22 can be input directly to the distinction circuit.

Description will next be made of optimization of the write current value by using the error detection circuit 32 according to the embodiment of the present invention.

In optimization of the write current using this embodiment, a write current setting register, a write current setting circuit (IWC) 60, and a write current output terminal of the signal processing circuit 38 are used.

The relation between the write current value of the recording head 9 of the magnetic disk drive 7 and the reproduced output amplitude input to the signal processing circuit 38 is substantially as shown in FIG. 5. Generally, the larger the reproduced output amplitude detected by the reproducing head 8, the better the quality of the reproduced signal becomes. If, for example, repetitive data, which oscillates in such a signal pattern as . . . +1, +1, −1, −1, +1, +1 . . . when this data is input to the detection means (ML) of the signal, is recorded, the typical signal amplitude is controlled by the automatic gain control circuit (AGC) such that the amplitude fluctuates only at two levels of positive and negative equalization target values, so that there is no "0" level. The smaller the reproduced output amplitude is, the larger the ratio of noise to signal becomes, so the error signals occur more often, and also the variance of the signals input to the distinction means of the ERRC is greater as shown in FIG. 5.

Therefore, by judging an error signal by a suitable negative threshold value in the distinction means of the error detection circuit 32 so that the occasions when the error signal is larger than the threshold value are counted each time the write current value is changed, the write current at which the count value (number of counts) is greatest (namely, the signal to noise ratio is greatest) can be detected. Note that in reproduction of recorded signals having the specific data pattern, the signals have only a substantially single frequency component and for which reason, the signal reproduction is not much affected by errors of the equalizer circuit or the like, errors of the write precompensation circuit, and the nonlinearity of the reproducing head and therefore optimization of the write current with high accuracy can be achieved. If results of several measurements, which were carried out with various threshold values in the distinction means are used, the deterioration of accuracy due to DC offset, for example, can be avoided, and obviously an improved equalization performance can be realized.

Description will then be made of optimization of the sense current using the error detection circuit 32 according to the embodiment of the present invention.

In optimization of the sense current using this embodiment, the signal processing circuit 38 includes a reproducing head (8) sense current setting register, a sense current (Is) setting circuit ISC 61 and a sense current output terminal.

Figure 6:
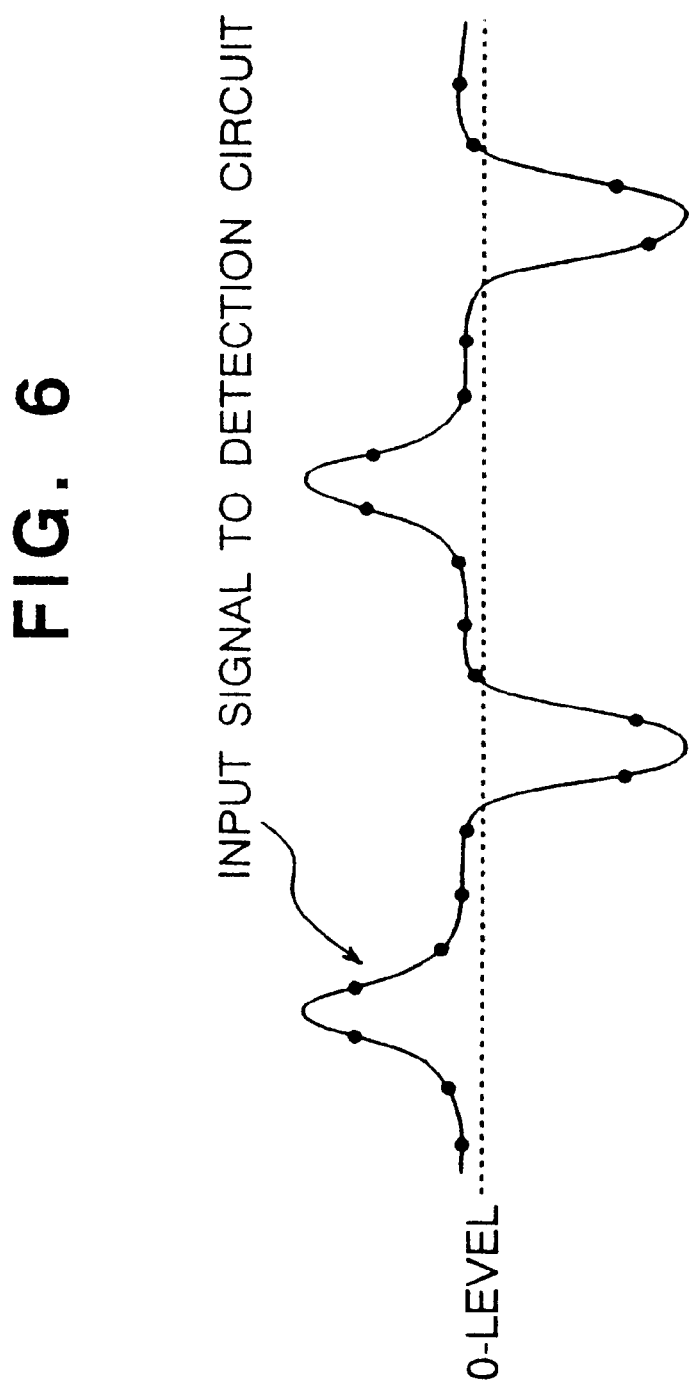
FIG. 6 shows waveforms of input to the signal processing circuit when the amplitude differs due to solitary waves of different polarities.

When a magnetoresistive effect element is used to form a reproducing head 8 of a magnetic disk apparatus 7, if bias magnetization of the head 8 is not optimized, the amplitude of the reproduced waveform varies due to different polarities of solitary magnetizations. The waveforms of solitary waves are input to the signal processing circuit 38 through AC coupling, the input signal to the detection circuit shifts with respect to the 0 level, as shown in FIG. 6. Therefore, data is recorded in a recording pattern such that the magnetization density on the recording medium is lowest, and errors are detected by ERRC 32, described below, each time the sense current is changed.

The detection level of output of the second detection circuit 55 is set at "0" so that the input signal supplied to the detection circuit is supplied to the distinction circuit, and the threshold value of the distinction circuit is set at "0" so that each time the sense current value is changed, the occasions that the threshold value "0" is exceeded for a fixed period of time are counted. When the bias magnetization by the sense current is not optimized and the amplitude ratio varies, the mean value of the error signals shifts from "0", so that the ratio of the count value to a total population parameter shifts from ½. Note that when the input signal to the detection circuit 22 has been quantized, the above-mentioned ratio of the count value shifts rather greatly at the set optimum sense current, so obviously it is necessary to consider the number of bits in quantization.

According to this embodiment, by selecting a sense current value at which the shift of the mean value of error signals from "0" is smaller than the reference value and the variance of error signals is smallest, the optimum sense current can be obtained. At this time, the coefficient values of the equalizer circuit and the write pre-compensation amount need not be optimum ones.

Description will be made of optimization of the DC offset compensation amount of ADC 19 using the error detection circuit 32 according to the embodiment of the present invention.

In optimization of the DC offset compensation amount of ADC using this embodiment, an offset setting circuit 62 for DC offset compensation and an offset compensation register are used in ADC 19, and the offset amount when no signal is supplied is detected by the error detection circuit 32.

By making arrangement such that the input signal to the detection circuit 22 is comprised only of a substantially random and small circuit noise, and detecting errors by the error detection circuit 32 each time the offset compensation amount is changed, the offset compensation amount at which the shift of the mean value of the error signals from "0" is smallest is taken as the optimum offset compensation amount. It is obviously appropriate to include the offset setting circuit 62 in the input portion of the ML 22 when the equalizer circuit 20 and the detection circuit 22 (ML) are analog circuits.

According to this embodiment, the offset of the circuit portion can be adjusted relatively easily. It should be noted that the coefficient values of the equalizer circuit may be basically arbitrary values.

As another modification, any other method of offset detection than mentioned above may be used.

In optimization of the DC offset compensation amount of ADC 19 using this embodiment, the signal processing circuit 38 includes an offset setting circuit 62 for DC offset compensation and an offset compensation register, and the error detection circuit 32 is used by supplying an input signal of a single frequency.

Write data is specified as having a single recording frequency, and the same error detection is used as the one described when reference was made to the optimization of the write current value in the embodiment described above. When an offset occurs, the AGC or PLL's operates to compensate the input signal of the detection circuit so as to comply with the equalizing target value, but the AGC and the PLL basically do not have a function to compensate the offset; therefore, as a result of the control operation, jitter (noise) increases or a shift from the equalizing target value occurs. Therefore, by detecting errors each time the set offset compensation value is changed, the offset compensation amount is searched at which the variance of errors of input to the detection circuit 22 is smallest, and the offset compensation amount at this time is taken as the optimum offset compensation amount.

According to this embodiment, the same means as in the optimization of the write current value mentioned above can be used. Therefore, prior to optimization of the write current, the offset adjustment described in this embodiment can be executed, and the time of adjustment can be shortened. Note that the coefficients of the equalizer circuit, the write pre-compensation amount, the write current value and the sense current may basically be arbitrary ones.

Description will next be made of optimization of the tap coefficients of the equalizer circuit 20 using the error detection circuit 32 according to the present invention.

In optimization of the tap coefficient values of the equalizer circuit 20 using this embodiment, a coefficient value register to give certain characteristics to the equalizer circuit and an error detection circuit 32 are used, but the coefficient compensation circuit 31 is not used. When coefficient compensation using the coefficient compensation circuit 31 is executed in a specific recording/reproducing area, it is sometimes possible to roughly estimate the coefficient values in other nearby areas. In this case, error detection is performed with estimated coefficient values set in the coefficient value registers, and a decision is made whether or not to adopt the coefficient values estimated from the error values.

At this time, the write data is random data and the detection level of the second detection circuit 55 is set at "2".

According to this embodiment, also in ordinary reproduction of user data, by setting coefficient values in the coefficient register and checking the error amount by the error detection circuit 32, whether the coefficient values are adequate or not can be decided. Moreover, it is possible to prepare a couple of combinations of coefficient values, and select a combination of coefficient values by which the variance of equalization errors is smallest.

Description will be made of optimization of the write pre-compensation amount using the error detection circuit 32 according to the embodiment of the present invention.

In optimizing the write pre-compensation amount using this embodiment, a compensation value register of the write pre-compensation circuit (WPC) 12 is used to compensate the flux reversal positions in recording data according to a data sequence. As the recording density becomes higher and the bit intervals become closer, the flux reversal positions become closer. Therefore, data is written while the write pre-compensation circuit 12 estimates the rate of movement of magnetization and compensates the reversal positions of magnetization. In this process, the error detection circuit decides whether or not the compensation could be achieved accurately.

In this process, data to be recorded is random data, and data is recorded using different values of the compensation value register 12, and error detection is performed each time the recorded data is reproduced. The write pre-compensation amount can be optimized by selecting a write pre-compensation amount at which the variance of errors input to the detection circuit is smallest.

Another modification of the error detection circuit 32 described above will be described with reference to FIG. 17.

In this embodiment, the error detection circuit 32 includes a distinction circuit 56 to receive an input signal which is also supplied to the detection circuit 22 and output a count signal when the input signal is larger than the threshold value, a counter 49 to count count signals output from the distinction circuit 56, and a register 57 to set the threshold value.

According to this embodiment, by arranging such that the input signal to the detection circuit comprises only a substantially random circuit noise and detecting errors each time the offset compensation amount setting is changed, and thus selecting an offset compensation amount at which the shift of the mean value of error signals output from the equalizer circuit from "0" is smallest, the offset compensation amount can be optimized. Likewise, the sense current of the magnetoresistive element type reproducing head can be optimized.

Yet another modification of the error detection circuit 32, shown in FIG. 17, according to the present invention will be described with reference to FIG. 18.

The error detection circuit 32 includes a first distinction circuit 56 to receive an input signal which is also sent to the detection circuit 22 and output a count signal when an input signal is less than the threshold value, a first counter 49 to count count signals of the first distinction circuit 56, a second distinction circuit 56' to output a count signal when an input signal is larger than the threshold value, a second counter 49' to count count signals output from the second distinction circuit 56', an adder 41 to subtract the count value of the second counter 49' from the count value of the first counter means 49, a register 63 to hold the subtraction result, and a register 57 to set the above-mentioned threshold value.

According to this embodiment, by using the output signal of the equalizer circuit directly in the error counting process, it is possible to optimize offset compensation and also optimize the sense current of the magnetoresistive effect type reproduction head.

Figure 19:
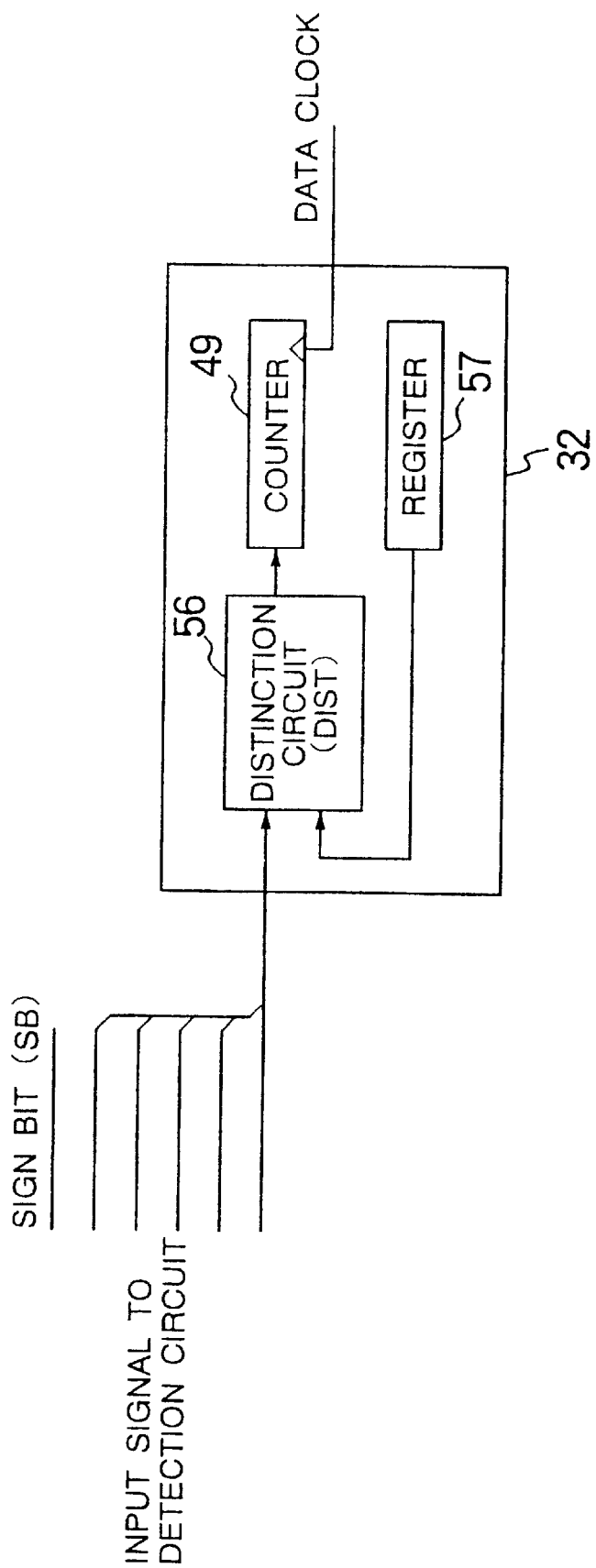
FIG. 19 is a diagram showing a modification of the error detection circuit in the embodiment of the present invention.

A still further modification of the error detection circuit 32 shown in FIG. 17 will be described with reference to FIG. 19.

Figure 17:
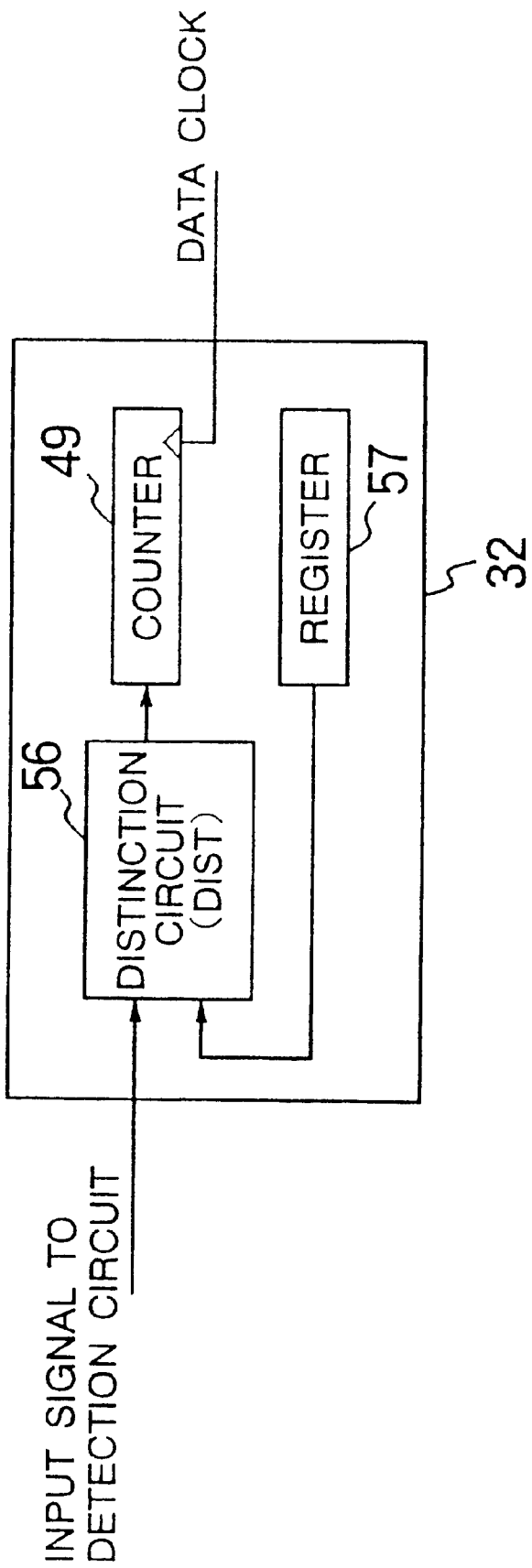
FIG. 17 is a diagram showing a modification of the error detection circuit in the embodiment of the present invention.
Figure 18:
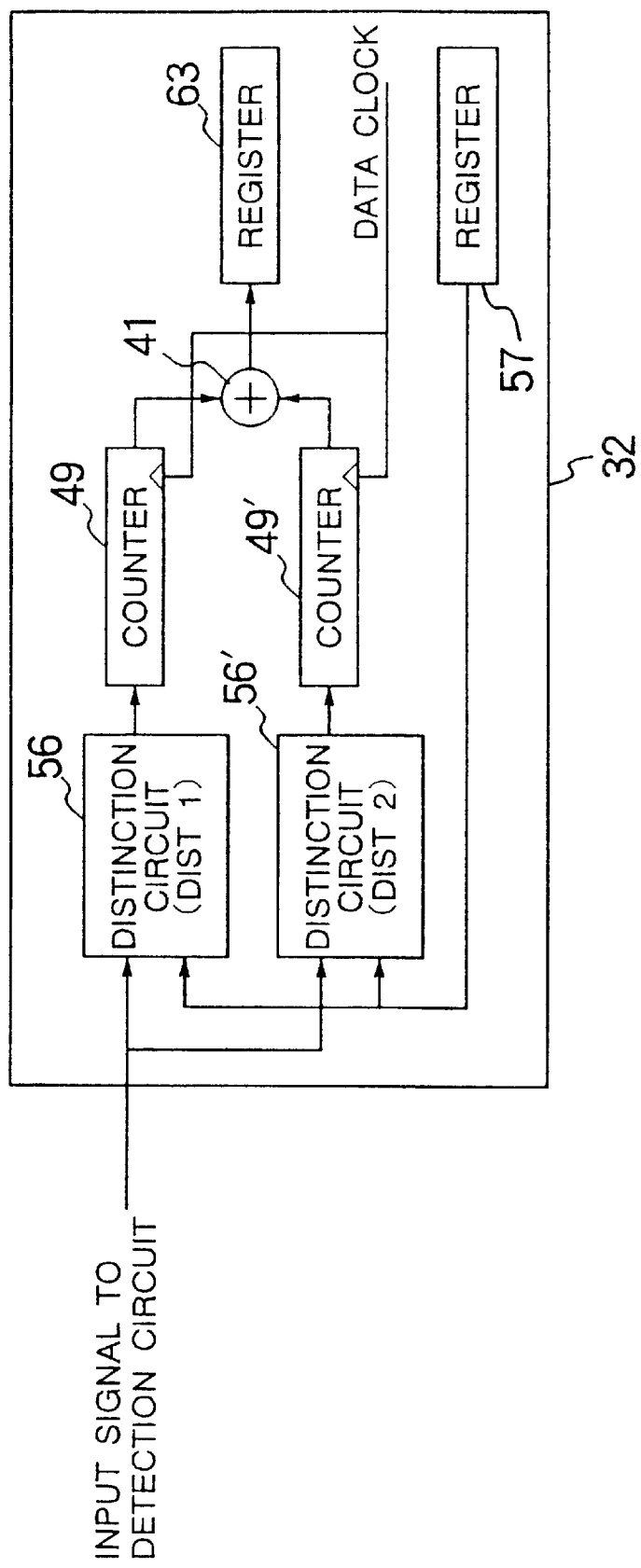
FIG. 18 is a diagram showing a modification of the error detection circuit in the embodiment of the present invention.

In this embodiment, by using the error detection circuit 32 shown in the embodiment in FIG. 17 or 18, of the whole input signal to the detection circuit 22, the remaining signal from which the sign bits (SB) have been removed is used as the input signal.

Figure 7B:
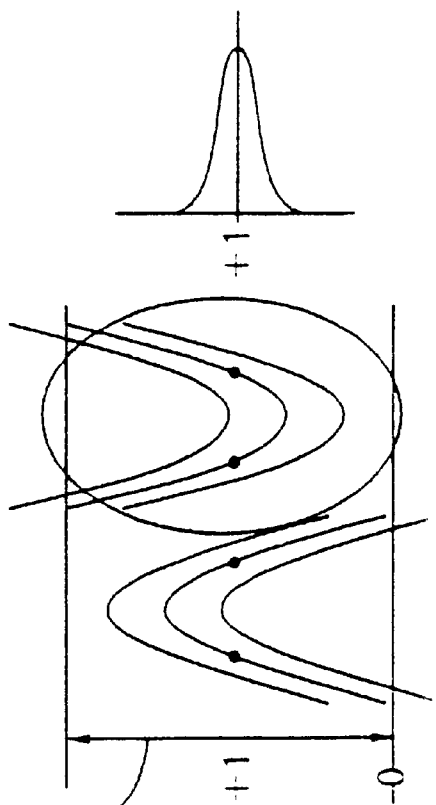
FIG. 7 is a diagram showing signal conversion by removal of the sign bits.
Figure 7A:
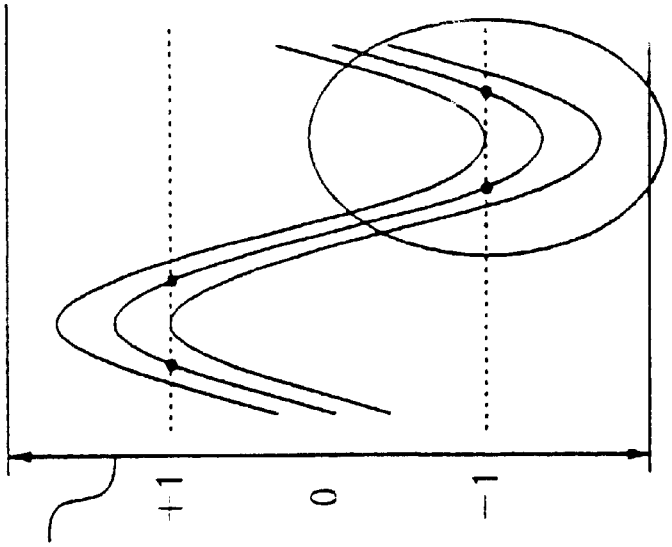

When the sign bits are removed from the input signal to the detection circuit (output from the equalizer circuit), if the original signal is negative, the signal is converted into a positive signal, and if the original signal is positive, the signal remains unchanged (on condition that the original signal is expressed in 2s complements). If the output signal of the equalizer circuit has a substantially single frequency component of . . . +1, +1, −1, −1, +1, +1, −1, −1, . . . the signal from which sign bits have been removed is converted as shown in FIG. 7.

According to this embodiment, if the threshold value of the distinction circuit is set in the neighborhood of the equalization target value of the equalizer circuit, the variance of errors from the target value can be detected.

Figure 20:
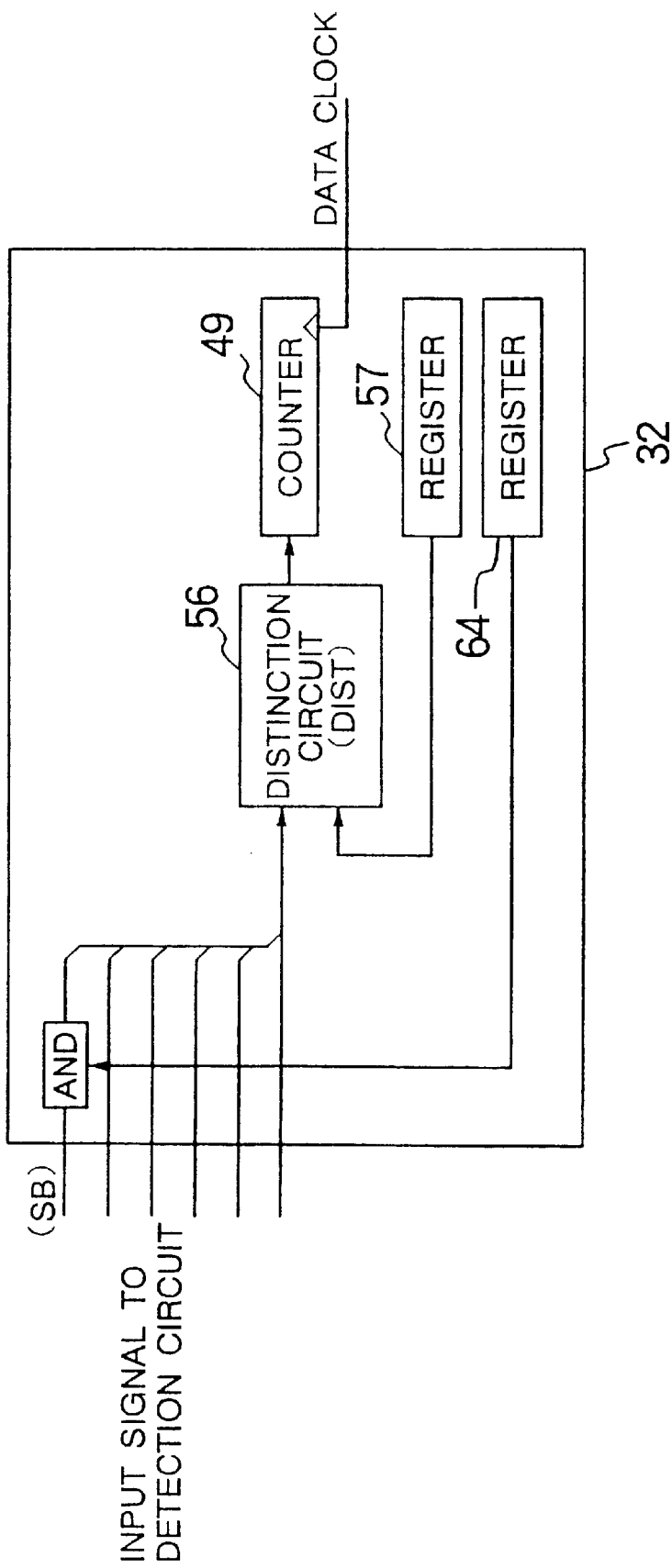
FIG. 20 is a diagram showing a modification of the error detection circuit in the embodiment of the present invention.

An additional modification of the error detection circuit 32, shown in FIG. 17, according to the present invention will be described with reference to FIG. 20.

In this embodiment, another error detection circuit other than those described above is used. To be more specific, an error detection circuits 32 shown in FIG. 18 or 19 and another error detection circuit in FIG. 20 are used. In this embodiment, there are two modes: a first mode is that, of the whole input signal to the detection circuit 22, the signal from which the sign bits (SB) have been removed is used as the input signal and a second mode is that the sign bits (SB) are included in the input signal. The mode is switched by applying the output of a register 64 to an AND gate 65.

The circuit according to this embodiment is simpler than the second detection circuit DET in ERRC, and offset control, write current optimization and sense current optimization can be performed by a substantially same method.

A circuit for resetting PRE-CODER 13 according to the present invention will next be described.

In this embodiment, in order to improve the reliability of recording and reproduction of a specific recorded data pattern required to optimize the parameters, there is provided a circuit to reset PRE-CODER 13 just before a "sync bite" to indicate the start of data when recording data.

According to this embodiment, the magnetized condition of the data pattern from the sync byte on can be defined, and it is possible to record a specific pattern required to optimize the parameters. Also, a specific pattern to be recorded when checking the magnetic disk drive 7 before its shipment can be recorded while the magnetized condition is defined, which raises hopes for improvement in reliability of the drive.

Figure 21:
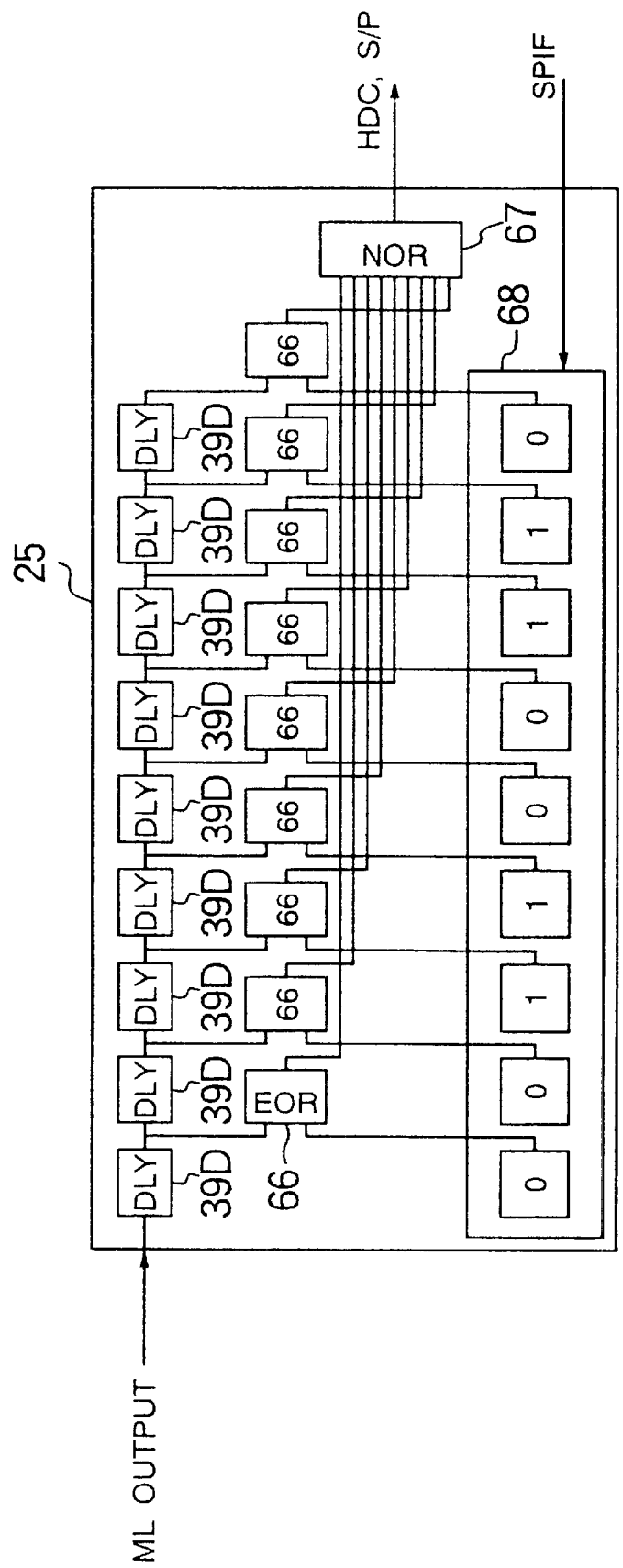
FIG. 21 is a diagram showing the sync byte detection circuit in the embodiment of the present invention.
Figure 22:
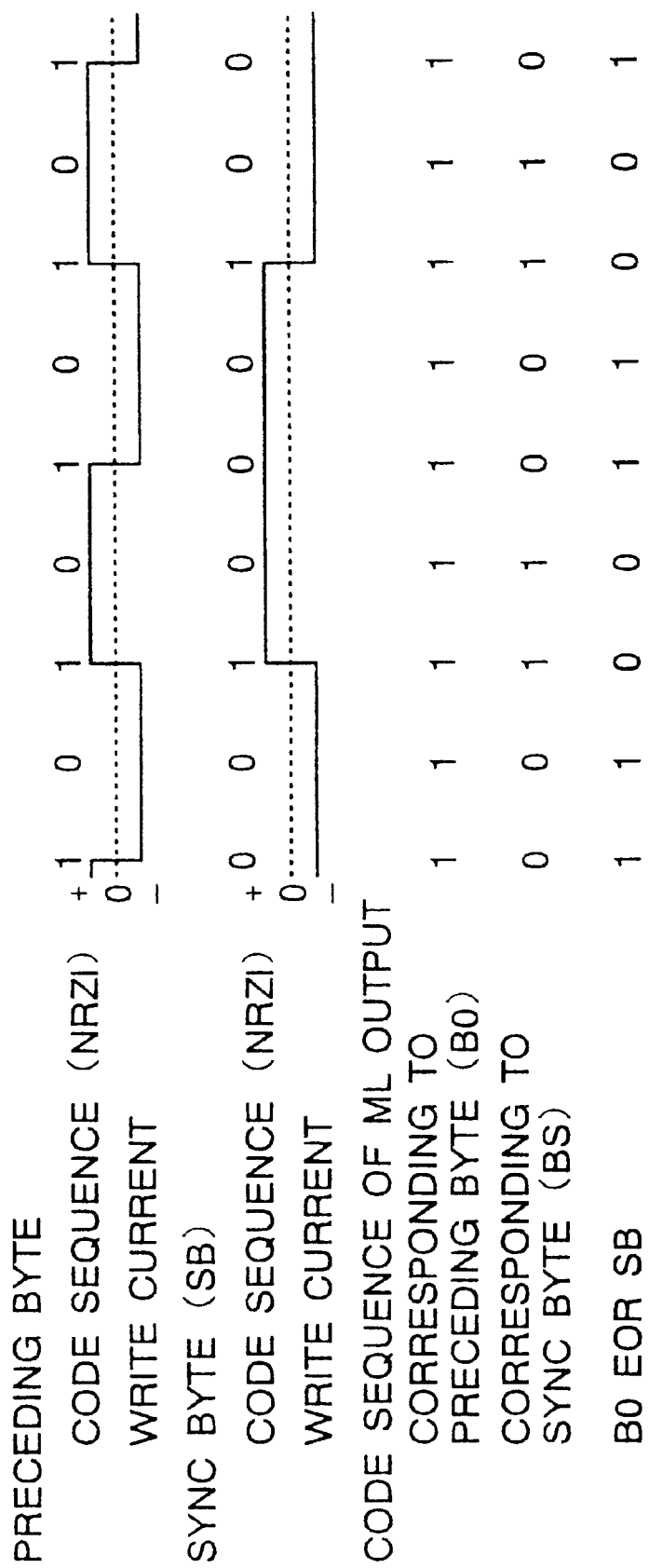
FIG. 22 is a diagram for explaining the sync bite detection circuit in the embodiment of the present invention.

A sync byte code sequence in the present invention will be described with reference to FIGS. 21 and 22.

In this embodiment, to improve the reliability of recording and reproduction of a specific data pattern required to optimize the parameters, a code sequence corresponding to the sync byte according to the present invention is applied in the sync byte detection circuit 25. The code sequence corresponding to the sync byte is set in a register 68, and in a logic element SOR 66, the code sequence is compared with a code sequence of ML output stored in delay elements (DLY) 39D, and all output bits are processed by a logic element NOR circuit 67 to form a detection signal of the sync byte, and the detection result is output through SPIF 33 to HDC 4. As shown in FIG. 22, by using a recording system such that a flux reversal occurs at data "1" and the write current direction is maintained at data "0", the sync byte is formed by a code sequence such that the start of serial data begins with "0" and no continuation of data "1" exists in a sequence of serial data. In addition to the above-mentioned embodiment, the code sequence of the sync byte is arranged such that a sequence of codes "0" and "1" in ML output corresponding to a sync byte differs for more than ½ of a data sequence of the sync byte from a sequence of codes "0" and "1" in ML output corresponding to a preceding byte recorded continuously before the sync byte. Note here that the code sequence (NRZI) is "001000100", and "001100110" is set in the register 68 corresponding to ML output.

According to this embodiment, it is possible to form a sync byte which does not interfere with the data pattern of a preceding byte, written before, for the AGC and the PLL, recorded before and which is hardly susceptable to nonlinear distortion in recording. Therefore, a sync bytes can be detected relatively easily even if the write current, the sense current and the coefficients of the equalizer circuit are not optimized.

In another embodiment of the present invention, for the ACC 29, target amplitude value setting means is used by which the target amplitude value of the automatic gain control circuit (AGC) can be varied by using the setting values in a register as shown in FIG. 1.

According to this embodiment, when the resolution of input signal is low, by using a small target amplitude value of AGC, the signal can be prevented from being saturated at various portions of the signal processing circuit, and for example, the effect of impulse noise can be reduced. When the resolution of input signal is high, conversely, by using a large target amplitude value of AGC, the ratio of noise, such as quantization noise in ADC 19 and circuit noise in VGA 17 and LPF 18 relative to the signal can be reduced, by which the apparatus performance (BER, for example) can be improved.

Figure 23:
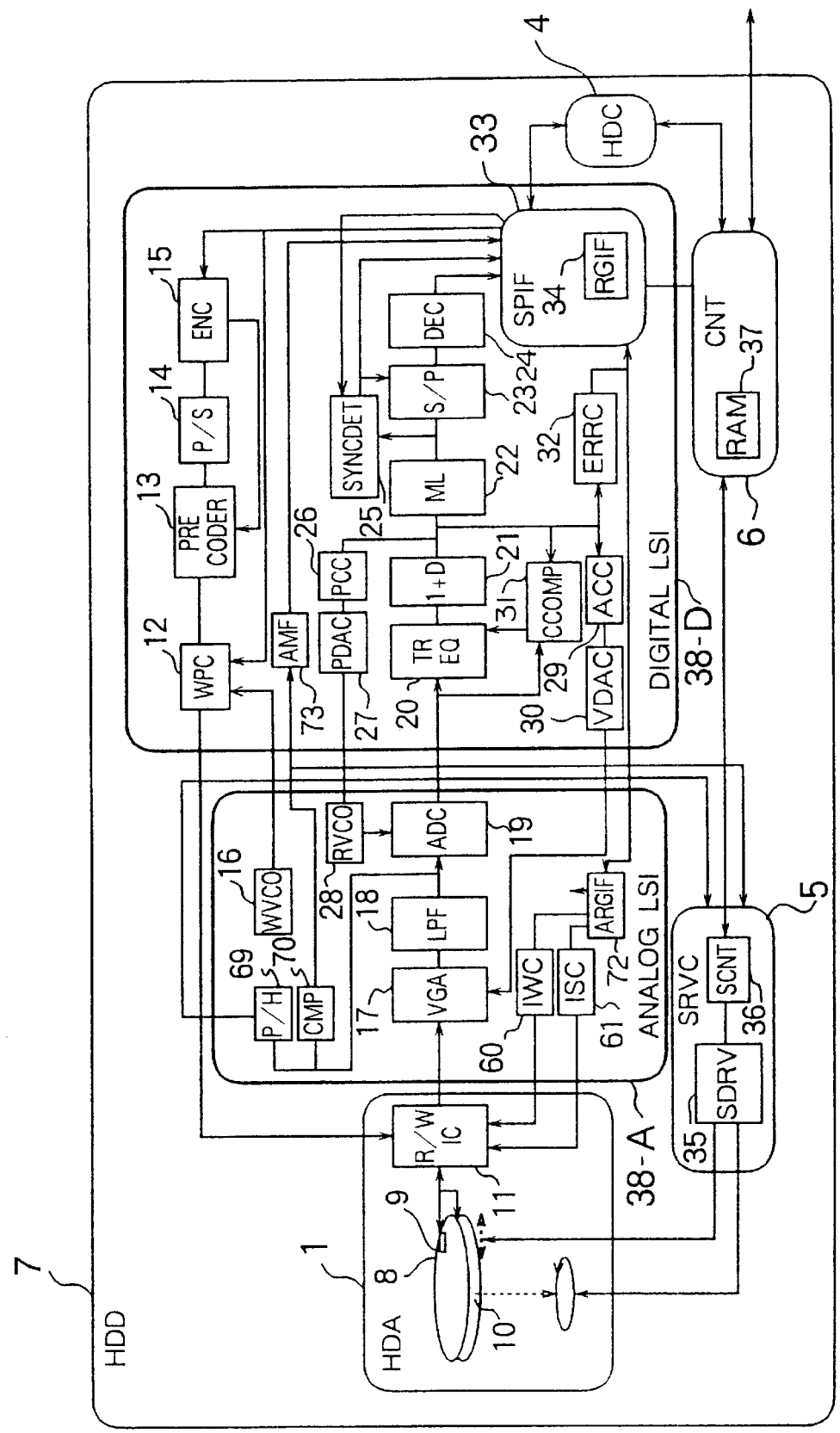
FIG. 23 is a diagram showing another embodiment of the present invention.

Another embodiment of the present invention will be described with reference to FIG. 23.

This embodiment is a case in which the present invention is applied to the magnetic disk drive in the form of a two-chip signal processing LSI.

Generally, the signal processing circuit realized in a one-chip LSI including all signal processing elements is preferable, but when power consumption is large, it is more preferable to form the circuit in two or more subdivided chips.

In order to solve this problem, in this embodiment, the signal processing circuit is formed in a LSI with two chips, an analog chip 38-A and a digital chip 38-D, and the outputs of the automatic gain control circuit (AGC) and the automatic phase lock loop (PLL) on the digital chip are supplied through current-output type VDAC 30 and PDAC 27 via pin terminals to a variable gain amplifier (VGA) 17 and a voltage controlled oscillator (RVCO) 28 on the analog chip 38-A. The other devices mounted on the analog chip 38-A include VGA 17, LPF 18, ADC 19, RVCO 28, WVCO 16, a servo signal processing circuit made up of a peak hold circuit (P/H) 69 and a comparator (CMP) 70 for servo signals of Gray code, and a register interface for the analog chip (ARGIF) 72. Further, the devices mounted on the digital chip 38-D include an address mark finder circuit (AMF) 73 for detecting an address mark from the output pulse train of CMP 70.

According to this embodiment, the signals are output in the form of DAC current from the digital chip, so that the effects of noise likely to enter the signals from the digital chip can be reduced, and the required number of pins can be substantially reduced compared with a case where those signals are output in several-bit codes. The ADC, RVCO and WVCO which require analog circuit design method and layout method are preferably arranged on the analog chip from viewpoints of performance, circuit scale, and power consumption. Needless to say, the above-mentioned circuits can be arranged on the digital chip and, in this case, the number of signal pins between the analog and digital chips can be further reduced.

In this embodiment, the signal interface between the signal processing LSI and the other circuit portion of the magnetic disk drive has the following features.

First, the analog, reproduced signal from the R/W IC, write current and sense current setting signals and P/H output signal are transmitted to and from the analog LSI. Second, signals in digital form are transmitted to and from the HDC and the CNT. Third, the signals transmitted between the analog and digital LSI's are the digital output from the ADC and DAC current signals from the PDAC used as control signals of the RVCO and the VGA.

When the signal processing circuit is formed in a two-chip structure, the process design method and the manufacturing method can be selected separately for the respective chips, so that the performance and the efficiency of development of the respective chips can be expected to improve. For example, the analog chip can be manufactured by the bipolar and BiCOMOS LSI processes which have shown favorable analog characteristics and a history of proven success. Needless to say, it is possible to manufacture the two chips by the same BiCMOS or CMOS process. A possible method in design and manufacture is to apply the optimum manual layout for the analog portion on one hand and use the most suitable automatic layout for the digital portion on the other hand. Moreover, less expensive packages can be produced by subdivisions of power consumption, production yield can be improved by use of small-size chips, and consequently cost reduction in LSI chips can be realized. In addition, when such an LSI is used, a cost reduction of the magnetic disk drive can be achieved. In the embodiments mentioned above, an example of a two-chip structure has been shown, but the present invention is not limited to this structure and a structure of three chips or a further subdivision is possible.

The present invention is not limited to Viterbi decoding or PR4, but any other known amplitude discrimination method may be used. A combination of the partial response waveform process such as EPR and EERP and Viterbi decoding or a combination with Trellis coding modulation method can be applied.

If the coefficient compensation circuit and the error detection circuit of the equalizer circuit according to the present invention is applied to a signal processing circuit or a magnetic recording/reproducing apparatus adapted to high-speed signal transmission, the optimization of the parameters of the circuit and the apparatus can be achieved relatively easily and in a short time. Accordingly, the signal processing circuit or the magnetic recording/reproducing apparatus will have better performance as a matter of course, the adjustment time can be shortened, and a substantial cost reduction of the circuit and the apparatus can be expected.

What is claimed is:

1. An information recording/reproducing apparatus, comprising:
   a head disk assembly;
   a signal processing circuit, connected to said head disk assembly, and including an equalizer circuit with five or more taps, a coefficient compensation circuit for sequentially compensating coefficients of said equalizer circuit and a phase detection circuit for sequentially detecting phases of an output signal of said equalizer circuit; and
   a training area for coefficient compensation, recorded on a recording medium of said information recording/reproducing apparatus, and defined as an area for recording and reproducing user data,
   wherein tap coefficients adjacent on both sides to a center tap of said equalizer circuit are specified at the same value.

2. An information recording/reproducing apparatus, comprising:
   a head disk assembly;
   a signal processing circuit, connected to said head disk assembly, and including an equalizer circuit with five or more taps, a coefficient compensation circuit for sequentially compensating coefficients of said equalizer circuit, and a phase detection circuit for sequentially detecting phases of an output signal of said equalizer circuit;
   wherein said coefficient compensation is carried out at a user site, and
   wherein only two tap coefficients adjacent on both sides to a center tap of said equalizer circuit are specified at the same value and tap coefficients other than said two tap coefficients are set free.

3. An information recording/reproducing apparatus according to claim 2, wherein said coefficient compensation is carried out at all times.

4. An information recording/reproducing apparatus, comprising:
   a head disk assembly;
   a signal processing circuit, connected to said head disk assembly, and including an equalizer circuit with five or more taps, a coefficient compensation circuit for sequentially compensating coefficients of said equalizer circuit, and a phase detection circuit for sequentially detecting phases of an output signal of said equalizer circuit;
   wherein said coefficient compensation is carried out by user data area; and
   wherein tap coefficients adjacent on both sides to a center tap of said equalizer circuit are specified at the same value.

5. An information recording/reproducing apparatus according to claim 4, wherein said user data area is in a user site.

6. An information recording/reproducing apparatus according to claim 4, wherein said coefficient compensation is carried out at all times.

7. An information recording/reproducing apparatus according to claim 4, wherein tap coefficients at the positions symmetric with respect to a center tap of said equalizer circuit are specified at the same value.

8. An information recording/reproducing apparatus, comprising:
   a head disk assembly;
   a signal processing circuit, connected to said head disk assembly, and including an equalizer circuit with five or more taps, a coefficient compensation circuit for sequentially compensating coefficients of said equalizer circuit and a phase detection circuit for sequentially detecting phases of an output signal of said equalizer circuit; and
   a PLL connected to said signal processing circuit;
   a training area for coefficient compensation, recorded on a recording medium of said information recording/reproducing apparatus, and defined as an area for recording and reproducing user data.

9. An information recording/reproducing apparatus, comprising:
   a head disk assembly;
   a signal processing circuit, connected to said head disk assembly, and including an equalizer circuit with five or more taps, a coefficient compensation circuit for sequentially compensating coefficients of said equalizer circuit, and a phase detection circuit for sequentially detecting phases of an output signal of said equalizer circuit; and
   a PLL connected to said signal processing circuit,
   wherein said coefficient compensation is carried out at a user site, and
   wherein only two tap coefficients adjacent on both sides to a center tap of said equalizer circuit are specified at the same value and tap coefficients other than said two tap coefficient are set free.

10. An information recording/reproducing apparatus, comprising:
    a head disk assembly;
    a signal processing circuit, connected to said head disk assembly, and including an equalizer circuit with five or more taps, a coefficient compensation circuit for sequentially compensating coefficients of said equalizer circuit, and a phase detection circuit for sequentially detecting phases of an output signal of said equalizer circuit; and
    a PLL connected to said signal processing circuit,
    wherein said coefficient compensation is carried out by user data area.

11. An information recording/reproducing apparatus, comprising:
- a head disk assembly;
- a signal processing circuit connected to said head disk assembly, and including an equalizer circuit with five or more taps, a coefficient compensation circuit for sequentially compensating coefficients of said equalizer circuit, and a phase detection circuit for sequentially detecting phases of an output signal of said equalizer circuit; and
- a training area for coefficient compensation, recorded on a recording medium of said information recording/reproducing apparatus, and defined as an area for recording/reproducing user data,
- wherein only two tap coefficients adjacent on both sides to a center tap of said equalizer circuit are specified at the same value and tap coefficients other than said two tap coefficients are set free.

12. An information recording/reproducing apparatus, comprising:
- a head disk assembly; and
- a signal processing circuit connected to said head disk assembly, and including an equalizer circuit with five or more taps, a coefficient compensation circuit for sequentially compensating coefficients of said equalizer circuit, and a phase detection circuit for sequentially detecting phases of an output signal of said equalizer circuit,
- wherein said coefficient compensation circuit includes a plurality of coefficient registers for holding tap coefficients of said respective taps of said equalizer circuit, wherein an output of one of said plurality of coefficient registers is given to two taps adjacent on both sides to a center tap of said equalizer circuit and outputs of different coefficient registers are given to taps, respectively, other than said center tap and said two taps.

13. An information recording/reproducing apparatus according to claim 12, further comprising a training area for coefficient compensation, recorded on a recording medium of said information recording/reproducing apparatus, and defined as an area for recording/reproducing user data,
- wherein said signal processing circuit reads said training area and compensates the tap coefficients held in said plurality of said coefficient registers.

* * * * *